(12) United States Patent
Nishikawa et al.

(10) Patent No.: US 7,216,943 B2
(45) Date of Patent: May 15, 2007

(54) HYBRID VEHICLE

(75) Inventors: Ryo Nishikawa, Wako (JP); Hirokatsu Amanuma, Wako (JP); Kazuhisa Yamamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/984,844

(22) Filed: Nov. 10, 2004

(65) Prior Publication Data

US 2005/0099146 A1 May 12, 2005

(30) Foreign Application Priority Data

Nov. 12, 2003 (JP) ............................. 2003-382289

(51) Int. Cl.
*B60L 7/18* (2006.01)

(52) U.S. Cl. ..................... 303/152; 303/151; 180/65.1; 180/233; 180/242; 318/63

(58) Field of Classification Search ................ 303/151, 303/152
See application file for complete search history.

(56) References Cited

U.S. PATENT DOCUMENTS

| | | | | |
|---|---|---|---|---|
| 5,895,100 | A * | 4/1999 | Ito et al. ..................... 303/152 |
| 6,070,953 | A * | 6/2000 | Miyago ....................... 303/152 |
| 6,205,379 | B1 * | 3/2001 | Morisawa et al. ............. 701/22 |
| 6,406,105 | B1 * | 6/2002 | Shimada et al. ............. 303/152 |
| 6,454,364 | B1 * | 9/2002 | Niwa et al. .................. 303/152 |
| 6,484,833 | B1 * | 11/2002 | Chhaya et al. .............. 180/65.4 |
| 6,549,832 | B2 * | 4/2003 | Nakasako et al. ............. 701/22 |
| 6,549,840 | B1 * | 4/2003 | Mikami et al. ............... 701/69 |
| 6,598,945 | B2 * | 7/2003 | Shimada et al. ............ 303/152 |
| 6,663,197 | B2 * | 12/2003 | Joyce ......................... 303/152 |
| 6,704,627 | B2 * | 3/2004 | Tatara et al. .................. 701/22 |
| 6,739,677 | B2 * | 5/2004 | Tazoe et al. ................ 303/152 |
| 6,811,229 | B2 * | 11/2004 | Soga ......................... 303/152 |

(Continued)

FOREIGN PATENT DOCUMENTS

JP 3059826 4/2000

(Continued)

*Primary Examiner*—Lincoln Donovan
*Assistant Examiner*—Robert W. Horn
(74) *Attorney, Agent, or Firm*—Arent Fox LLP

(57) ABSTRACT

A hybrid vehicle is capable of performing regenerative operations of generator-motors disposed adjacently to front wheels and/or rear wheels of the vehicle so as to achieve efficient conversion of kinetic energy of the vehicle into electric energy as much as possible when the vehicle slows down, thereby permitting higher use efficiency of energy. When the vehicle decelerates, a target deceleration force or a target deceleration torque of the vehicle is set, and a permissible maximum value of the braking torque to be imparted to rear wheels from a second generator-motor is set, and the permissible maximum value and the target deceleration torque of the vehicle, whichever is smaller, is set as a target braking torque to be imparted from the second generator-motor to the rear wheels. Furthermore, with the remaining torque of the target deceleration torque being set as an upper limit, a target braking torque to be imparted to front wheels from a first generator-motor is determined, and a friction type braking mechanism compensates a shortfall torque of a total sum of the target braking torques of the two generator-motors to reach the target deceleration torque.

14 Claims, 13 Drawing Sheets

U.S. PATENT DOCUMENTS

| | | | |
|---|---|---|---|
| 6,862,511 B1 * | 3/2005 | Phillips et al. | 701/54 |
| 6,909,959 B2 * | 6/2005 | Hallowell | 701/88 |
| 6,930,405 B2 * | 8/2005 | Gunji | 290/40 C |
| 6,954,045 B2 * | 10/2005 | Nishikawa et al. | 318/376 |
| 6,988,779 B2 * | 1/2006 | Amanuma et al. | 303/152 |
| 2002/0094908 A1 * | 7/2002 | Urasawa et al. | 477/3 |
| 2003/0037977 A1 * | 2/2003 | Tatara et al. | 180/65.3 |
| 2003/0162631 A1 * | 8/2003 | Williams | 477/5 |
| 2003/0173826 A1 * | 9/2003 | Tazoe et al. | 303/152 |
| 2004/0050598 A1 * | 3/2004 | Saito et al. | 180/65.2 |
| 2004/0069548 A1 * | 4/2004 | Kira et al. | 180/65.3 |
| 2004/0147366 A1 * | 7/2004 | Aoki et al. | 477/6 |
| 2005/0103551 A1 * | 5/2005 | Matsuno | 180/243 |

FOREIGN PATENT DOCUMENTS

JP        2000-316204        11/2000

* cited by examiner

HYBRID VEHICLE

BACKGROUND OF THE INVENTION

1. Field of the Invention

The present invention relates to a hybrid vehicle and, more particularly, to a hybrid vehicle provided with a generator-motor capable of imparting torque to front wheels of the vehicle and another generator-motor capable of imparting torque to rear wheels thereof.

2. Description of the Related Art

A hybrid vehicle (so-called parallel hybrid vehicle) having an engine and a generator-motor, which is a motor capable of acting as a generator and also as a motor, as a driving source of the vehicle, normally performs regenerative operation of the generator-motor when the vehicle is slowing down so as to operate the generator-motor as a generator and to charge a battery (secondary battery) with the generated energy, the battery serving as a power source of the generator-motor. Thus, a part of the kinetic energy of the vehicle is converted into electric energy to be collected or absorbed by the battery. As a technique for performing the regenerative operation of a generator-motor when a vehicle slows down, there has been known a technique disclosed in, for example, the Japanese Unexamined Patent Application Publication No. 2000-316204 (hereinafter referred to as "patent document 1").

The patent document 1 has discloses a hybrid vehicle in which a rotating shaft (rotor) of a generator-motor is directly coupled to a crankshaft of an engine, and the generated torque of the engine and the torque of the generator-motor are output to wheels through the intermediary of a transmission. According to the technique described in the patent document 1, the regenerative operation of the generator-motor is performed when a brake pedal of the vehicle is operated. At this time, as the operating amount of the brake pedal increases, the regenerative current of the generator-motor increases. Thus, when the vehicle decelerates, the ratio of the kinetic energy of the vehicle that is lost due to mechanical frictional heat is decreased, while the ratio of the kinetic energy to be converted into electric energy is increased so as to improve the effective use of the energy.

There has been known another type of hybrid vehicle. This type of hybrid vehicle is provided with an additional generator-motor (hereinafter referred to as "the second generator-motor") capable of independently imparting torque to different driving wheels (e.g., rear wheels) from the driving wheels (e.g., front wheels) to which output torque of the engine and the generator-motor is imparted, in addition to the generator-motor (hereinafter referred to as "the first generator-motor") connected to the engine and the transmission, as in the case of the vehicle described in the patent document 1. In such a hybrid vehicle, both the first and second generator-motors are capable of performing regenerative operation when the vehicle slows down, so that how to successfully have the two generator-motors share the braking force of entire vehicle based on the regenerative operations becomes an important consideration.

This is typically handled as described below. When, for example, the vehicle is decelerated by braking, of all braking force of the vehicle, the braking force to be provided by the front wheels of the vehicle and the braking force to be provided by the rear wheels are determined according to a predetermined distribution ratio based on longitudinal weight distribution in the vehicle. Then, based on the determined braking forces, a friction type braking mechanism of the front wheels and a friction type braking mechanism of the rear wheels are controlled. Hence, the hybrid vehicle having the first and second generator-motors described above could be adapted so that the ratio of the braking force to be produced by the regenerative operation of the first generator-motor and the ratio of the braking force to be produced by the regenerative operation of the second generator-motor out of a total braking force required by the whole vehicle when the vehicle slows down are determined in advance on the basis of the longitudinal weight distribution of the vehicle.

However, the aforementioned method for determining the braking force distribution ratios between the generator-motors poses the following difficulties in achieving improved efficiency in use of energy.

Regarding the weight distribution of a vehicle, of the front wheels and the rear wheels, the pair of wheels equipped with an engine and the first generator-motor (hereinafter the front wheels in this case) are generally heavier than the other pair of wheels (hereinafter the rear wheels in this case). If, therefore, the braking force distribution ratio between the generator-motors is determined on the basis of the weight distribution of the vehicle, then the first generator-motor on the front wheel side will basically assume a larger share than the second generator-motor on the rear wheel side. However, the first generator-motor is coupled to the vehicular front wheels through the intermediary of a transmission, so that the efficiency of torque transmission between the first generator-motor and the front wheels is generally lower than that between the second generator-motor and the rear wheels. In addition, the engine is connected to the first generator-motor, so that a part of the kinetic energy of the vehicle transmitted from the front wheels of the vehicle to the first generator-motor is undesirably absorbed as a frictional heat inside the engine. This tends to lead to deteriorated efficiency of conversion of the vehicular kinetic energy into electric energy, making it difficult to improve the use efficiency of energy.

SUMMARY OF THE INVENTION

The present invention has been made with a view toward solving the aforementioned problem, and it is an object of the present invention to provide a hybrid vehicle having generator-motors disposed on the front wheel side and the rear wheel side, respectively, of the vehicle so as to allow either or both of the generator-motors to carry out regenerative operation to permit efficient conversion of vehicular kinetic energy into electric energy as much as possible when the vehicle decelerates, thereby making it possible to improve use efficiency of energy.

To this end, according to one aspect of the present invention, a hybrid vehicle comprises a first generator-motor connected to an output shaft of an engine that generates a driving force of the vehicle and also connected to either one of a pair of front wheels and a pair of rear wheels of the vehicle through the intermediary of a transmission so as to be capable of imparting torque to one of the pairs of wheels through the intermediary of the transmission, a second generator-motor connected to the other pair of wheels of the vehicle through the intermediary of a rotation transmitting means that has a higher torque transmission efficiency than at least the transmission so as to be capable of imparting torque to the other pair of wheels through the intermediary of the rotation transmitting means, a target deceleration force setting means for setting a target deceleration force of the vehicle when the vehicle decelerates, a second permissible maximum braking torque setting means for setting a second permissible maximum braking torque as a permissible maximum value of braking torque to be applied to the other pair of wheels from the second generator-motor, a target braking torque determiner for determining a target decelerating torque of the vehicle that corresponds to the target deceleration force or the second permissible maximum braking torque, whichever is smaller, as a target braking torque to be imparted to the other pair of wheels from the second generator-motor, and for determining a remaining torque, which is obtained by subtracting a target braking torque related to the second generator-motor from the target deceleration torque, as an upper limit of a target braking torque to be imparted to the one pair of wheels from the first generator-motor, and a control means for making the generator-motors perform regenerative operations such that the determined target braking torques are imparted to corresponding wheels from the respective generator-motors.

With this arrangement, a target braking torque to be imparted to the other pair of wheels from the second generator-motor (hereinafter referred to as "the target braking torque of the second generator-motor" in some cases) is determined to be either a target deceleration torque (the total of target values of the torques in a decelerating direction applied to the individual wheels of the vehicle) that corresponds to a target deceleration force, which is the force in the decelerating direction acting on the entire vehicle, and a second permissible maximum braking torque as a permissible maximum value of braking torque imparted to the other pair of wheels from the second generator-motor, whichever is smaller. Accordingly, the target braking torque of the second generator-motor is determined to be the same value as the target deceleration torque as long as the target deceleration torque remains below the second permissible maximum braking torque. Only if the target deceleration torque exceeds the second permissible maximum braking torque, the target braking torque of the second generator-motor is determined to be the same value as the second permissible maximum braking torque that is smaller than the target deceleration torque. The target braking torque to be imparted to the aforesaid one pair of wheels from the first generator-motor (hereinafter referred to as "the target braking torque of the first generator-motor" in some cases) uses, as its upper limit, the remaining torque, which is obtained by subtracting the target braking torque of the second generator-motor from the target deceleration torque, and is determined to be a torque that is smaller than the remaining torque. If the target braking torque of the second generator-motor is set to be the same value as that of the target deceleration torque, then the remaining torque will be zero, so that the target braking torque of the first generator-motor will automatically be zero also.

The target deceleration torque of the vehicle is assigned most preferentially to the target braking torque of the second generator-motor within a range in which the target braking torque of the second generator-motor does not exceed the second permissible maximum braking torque or does not become excessive. All or a part of the remaining torque is allocated to the target braking torque of the first generator-motor. According to the first aspect of the present invention, the generator-motors carry out their regenerative operations on the basis of the target braking torque of the first generator-motor and the target braking torque of the second generator-motor.

As a result, a highest possible percentage of conversion from the kinetic energy at deceleration of the vehicle into electric energy can be obtained by the regenerative operation of the second generator-motor having higher efficiency of transmission of torque between itself and the other pair of wheels. In other words, when the vehicle slows down, the regenerative operation of the second generator-motor can be performed so that the vehicular kinetic energy can be converted into electric energy with highest possible efficiency, permitting improved use efficiency of energy.

The action force applied to the vehicle is proportional to the acceleration of the vehicle. Therefore, the target deceleration force in the present invention comprises a target acceleration in the direction of vehicular deceleration in addition to the deceleration force in its original meaning.

Preferably, to be more specific, the target deceleration force setting means sets the target deceleration force on the basis of the speed of the vehicle, a gear position of the transmission, and a brake operation amount of the vehicle (a second aspect of the present invention). This makes it possible to set a preferable target deceleration force in decelerating the vehicle. Basically, in this case, the target deceleration force should be increased as the vehicle speed increases, and the target deceleration force should be increased as the brake operation amount increases. As the gear position of the transmission is closer to a lower ratio, the target deceleration force should be increased.

Preferably, the second permissible maximum braking torque setting means sets the second permissible maximum braking torque according to at least a road surface condition, taking the permissible maximum value of the braking torque of the other pair of wheels whereby a predetermined frictional force can be secured between, for example, the other pair of wheels and the road surface as the second permissible maximum braking torque (a third aspect of the present invention).

Preferably, the second permissible maximum braking torque setting means takes, as the second permissible maximum braking torque, a permissible maximum value of braking torque that can be imparted by the regenerative operation of the second generator-motor to the other pair of wheels, and sets the second permissible maximum braking torque according to at least a rated power generation output of the second generator-motor and the state of charge of a battery charged by the regenerative operation of the second generator-motor (a fourth aspect of the present invention).

Further preferably, the second permissible maximum braking torque in particular is composed of a mechanical permissible maximum value as the permissible maximum value of the braking torque of the other pair of wheels whereby a predetermined frictional force between the other pair of wheels and a road surface can be secured, and an electrical permissible maximum value as the permissible maximum value of the braking torque that can be imparted to the other pair of wheels by the regenerative operation of the second generator-motor, the second permissible maximum braking torque setting means sets the mechanical permissible maximum value according to at least a road surface condition and sets the electrical permissible maximum value according to at least a rated power generation output of the second generator-motor and a state of charge of the battery charged by the regenerative operation of the second generator-motor, and the target braking torque determiner determines the target deceleration torque, the mechanical permissible maximum value, or the electrical permissible maximum value, whichever the smallest as the target braking torque to be imparted to the other pair of wheels from the second generator-motor (a fifth aspect of the present invention).

More specifically, an excessive target braking torque of the second generator-motor frequently leads to slippage of the other pair of wheels to which braking torque is imparted from the second generator-motor. It is preferable therefore not to let the target braking torque of the second generator-motor exceed a permissible maximum value of the braking torque of the other pair of wheels whereby a predetermined frictional force (e.g., the frictional force that restrains the wheels from slipping) between the other pair of wheels and a road surface can be secured. The permissible maximum value can be set according to a road surface condition (e.g., a coefficient of friction of a road surface).

Thus, according to the third aspect of the present invention, a largest possible portion of the target deceleration torque can be allocated to the target braking torque of the second generator-motor while limiting the target braking torque of the second generator-motor to a range that allows a predetermined frictional force between the other pair of wheels and a road surface to be secured.

Further, the braking torque (regenerative torque) that can be produced by a regenerative operation of the second generator-motor is restricted by the rated power generation output of the second generator-motor (a maximum permissible power generation output in terms of the performance of the second generator-motor), and also restricted by a charge state of the battery serving as a power source of the second generator-motor. The charge state of the battery specifically means an amount of electric energy that can be accommodated by the battery, and it is based on the remaining capacity of the battery. For this reason, if the target braking torque of the second generator-motor reaches an excessive level, then the target braking torque cannot be actually produced by the second generator-motor.

Hence, according to the fourth aspect of the present invention, a largest possible portion of the target deceleration torque can be allocated to the target braking torque of the second generator-motor while limiting the target braking torque of the second generator-motor to a range that enables the second generator-motor to actually impart the torque to the other pair of wheels by its regenerative operation.

Especially, the fifth aspect of the present invention makes it possible to assign a largest possible portion of the target deceleration torque to the target braking torque of the second generator-motor while restricting the target braking torque of the second generator-motor to the range wherein a predetermined frictional force between the other pair of wheels and a road surface can be secured and wherein the second generator-motor can actually impart torque to the other pair of wheels by its regenerative operation. This means that a target braking torque of the second generator-motor that is optimum for achieving efficient conversion of vehicular kinetic energy into electric energy can be determined while successfully meeting the restrictive condition related to the frictional force between the other pair of wheels and a road surface and the electrical restrictive condition on the regenerative operation of the second generator-motor.

In the first to fifth aspects of the present invention described above, preferably, a first permissible maximum braking torque setting means is provided for setting first permissible maximum braking torque as a permissible maximum value of braking torque imparted to the aforesaid one pair of wheels from the first generator-motor, and the target braking torque determiner determines the remaining torque or the first permissible maximum braking torque, whichever is smaller, as a target braking torque to be imparted to the aforesaid one pair of wheels from the first generator-motor, and if a total sum of the target braking torque related to both generator-motors is below the vehicle target deceleration torque, then the target braking torque determiner determines the deficient torque as a target braking torque for the friction type braking mechanisms provided on the one pair of wheels and the other pair of wheels, and the control means comprises a means for controlling the friction type braking mechanisms so as to cause the friction type braking mechanisms to generate the target braking torque (a sixth aspect of the present invention).

According to the sixth aspect of the present invention, the target braking torque of the first generator-motor is set to the same value as that of the remaining torque as long as the remaining torque does not exceed the first permissible maximum braking torque. Only if the remaining torque exceeds the first permissible maximum braking torque, the target braking torque of the first generator-motor is set to the same value as that of the first permissible maximum braking torque, which is smaller than the remaining torque. If the total sum of the braking torques of the first and second generator-motors is below the target deceleration torque, then the torque equivalent to the shortfall is taken as the target braking torque of the friction braking mechanism, and the target braking torque is generated by the friction type braking mechanism.

Hence, the remaining torque is allocated as much as possible to the target braking torque of the first generator-motor within a range in which the target braking torque of the first generator-motor does not exceed the first permissible maximum braking torque (a range in which the first generator-motor is not excessive), while only the torque equivalent to the shortfall is allocated to the target braking torque of the friction type braking mechanism. As a result, a required deceleration force (target deceleration force) when a vehicle slows down can be secured and collected as electric energy into the battery, while minimizing the vehicular kinetic energy converted into heat energy by the friction type braking mechanism and consumed. This makes it possible to maximize the use efficiency of the energy.

In the sixth aspect of the present invention, the first permissible maximum braking torque is preferably set in the same manner as the second permissible maximum braking torque for the second generator-motor. More specifically, the first permissible maximum braking torque setting means preferably takes, as the first permissible maximum braking torque, a permissible maximum value of the braking torque of the one pair of wheels that allows a predetermined frictional force between the one pair of wheels and a road surface to be secured, and sets the first permissible maximum braking torque according to at least a road surface condition (a seventh aspect of the present invention).

This arrangement allows a greatest possible portion of the remaining torque to be allocated to a target braking torque of the first generator-motor while restricting a target braking torque of the first generator-motor within a range that makes it possible to secure a predetermined frictional force between the one pair of wheels and a road surface (e.g., a frictional force that restrains the one pair of wheels from slipping).

Alternatively, the first permissible maximum braking torque setting means preferably takes, as the first permissible maximum braking torque, a permissible maximum value of braking torque that can be imparted by the regenerative operation of the first generator-motor to the one pair of wheels, and sets the first permissible maximum braking torque according to at least a rated power generation output of the first generator-motor and the state of charge of a battery charged by the regenerative operation of the first generator-motor (an eighth aspect of the present invention).

This arrangement makes it possible to assign a largest possible portion of the remaining torque to the target braking torque of the first generator-motor while restricting the target braking torque of the first generator-motor to the range wherein the torque can be actually imparted to the other pair of wheels by the regenerative operation of the first generator-motor.

Further preferably, the first permissible maximum braking torque is composed of a mechanical permissible maximum value as the permissible maximum value of the braking torque of the one pair of wheels whereby a predetermined frictional force between the one pair of wheels and a road surface can be secured, and an electrical permissible maximum value as the permissible maximum value of the braking torque that can be imparted to the one pair of wheels by the regenerative operation of the first generator-motor, the first permissible maximum braking torque setting means sets the mechanical permissible maximum value for the one pair of wheels according to at least a road surface condition and sets the electrical permissible maximum value for the first generator-motor according to at least a rated power generation output of the first generator-motor and a state of charge of the battery charged by the regenerative operation of the first generator-motor, and the target braking torque determiner determines the remaining torque, the mechanical permissible maximum value for the one pair of wheels, or the electrical permissible maximum value for the first generator-motor, whichever the smallest as the target braking torque to be imparted to the one pair of wheels from the first generator-motor (a ninth aspect of the present invention).

With this arrangement, a greatest possible portion of the remaining torque can be allocated to a target braking torque of the first generator-motor while restricting a target braking torque of the first generator-motor within a range that makes it possible to secure a predetermined frictional force between the one pair of wheels and a road surface, and also to actually impart the torque to the one pair of wheels by the regenerative operation of the first generator-motor. This means that a target braking torque of the first generator-motor can be determined such that a greatest possible portion of the kinetic energy at the time of deceleration of a vehicle is converted into electric energy and collected by a battery while successfully meeting the restrictive condition related to the frictional force between the one pair of wheels and a road surface and the electrical restrictive condition on the regenerative operation of the first generator-motor.

In the sixth to ninth aspects of the present invention described above, if a total sum of the target braking torques related to the two generator-motors is below a target deceleration torque of the vehicle, the target braking torque setting means preferably determines the target braking torque of the friction type braking mechanism of the one pair of wheels and the target braking torque of the friction type braking mechanism of the other pair of wheels such that the ratio of the total sum of a target braking torque for the first generator-motor and a target braking torque of the friction type braking mechanism of the one pair of wheels to the target deceleration torque and the ratio of the total sum of a target braking torque for the second generator-motor and a target braking torque of the friction type braking mechanism of the other pair of wheels to the target deceleration torque approximate a predetermined ratio established on the basis of a longitudinal weight distribution of the vehicle and the target deceleration torque (a tenth aspect of the present invention).

With this arrangement, if a target deceleration torque cannot be completely shared by the two generator-motors and the friction type braking mechanism is used, then a braking torque will be produced by the friction type braking mechanisms of the one pair of wheels and the other pair of wheels such that the ratio of the total of a target braking torque for the first generator-motor and a target braking torque of the friction type braking mechanism of the one pair of wheels to the target deceleration torque and the ratio of the total sum of a target braking torque for the second generator-motor and a target braking torque of the friction type braking mechanism of the other pair of wheels to the target deceleration torque approximate a predetermined ratio established on the basis of a longitudinal weight distribution of the vehicle and the target deceleration torque, i.e., a ratio that is preferred in view of the longitudinal weight distribution of the vehicle. This makes it possible to achieve an ideal distribution ratio of a braking force shared by the front wheels and the rear wheels to provide the target deceleration force, while also achieving higher efficiency of conversion from the kinetic energy of the vehicle into electric energy.

In the first through ninth aspects of the present invention, preferably, a means for determining whether the vehicle is traveling straight is provided, and the control means comprises a means for controlling the generator-motors and the friction type braking mechanisms so that the ratio of the total sum of a braking torque imparted to the one pair of wheels from the first generator-motor and a braking torque of the friction type braking mechanism of the one pair of wheels to the target deceleration torque and the ratio of the total sum of a braking torque imparted to the other pair of wheels from the second generator-motor and a braking torque of the friction type braking mechanism of the other pair of wheels to the target deceleration torque approximate a predetermined ratio established on the basis of a longitudinal weight distribution of the vehicle and the target deceleration torque, if it is determined that the vehicle is not traveling straight (an eleventh aspect of the present invention).

Alternatively, it is preferred that a means for determining whether any one of the wheels of the vehicle is slipping is provided, and the control means comprises a means for controlling the generator-motors and the friction type braking mechanisms so that the ratio of the total sum of a braking torque imparted to the one pair of wheels from the first generator-motor and a braking torque of the friction type braking mechanism of the one pair of wheels to the target deceleration torque and the ratio of the total sum of a braking torque imparted to the other pair of wheels from the second generator-motor and a braking torque of the friction type braking mechanism of the other pair of wheels to the target deceleration torque approximate a predetermined ratio established on the basis of a longitudinal weight distribution of the vehicle and the target deceleration torque, if it is determined that a wheel is slipping (a twelfth aspect of the present invention).

With this arrangement, in a situation wherein a wheel is likely to slip, or if it is determined that the vehicle is not traveling straight, or if it is determined that a wheel is slipping, then the ratio of a braking force to be shared by the front wheels and the rear wheels to reach the target deceleration force can be set to an ideal value that restrains the wheels from slipping.

The eleventh aspect of the invention or the twelfth aspect of the invention may be combined with the tenth aspect of the invention described above. In this case, the predetermined ratio in the eleventh aspect of the invention or the twelfth aspect of the invention may be identical to the predetermined ratio in the tenth aspect of the invention. Further, the eleventh aspect of the invention may be combined with the twelfth aspect of the invention. In this case, the predetermined ratio in the eleventh aspect of the invention may be identical to the predetermined ratio in the twelfth aspect of the invention.

DESCRIPTION OF THE PREFERRED EMBODIMENTS

Figure 1:
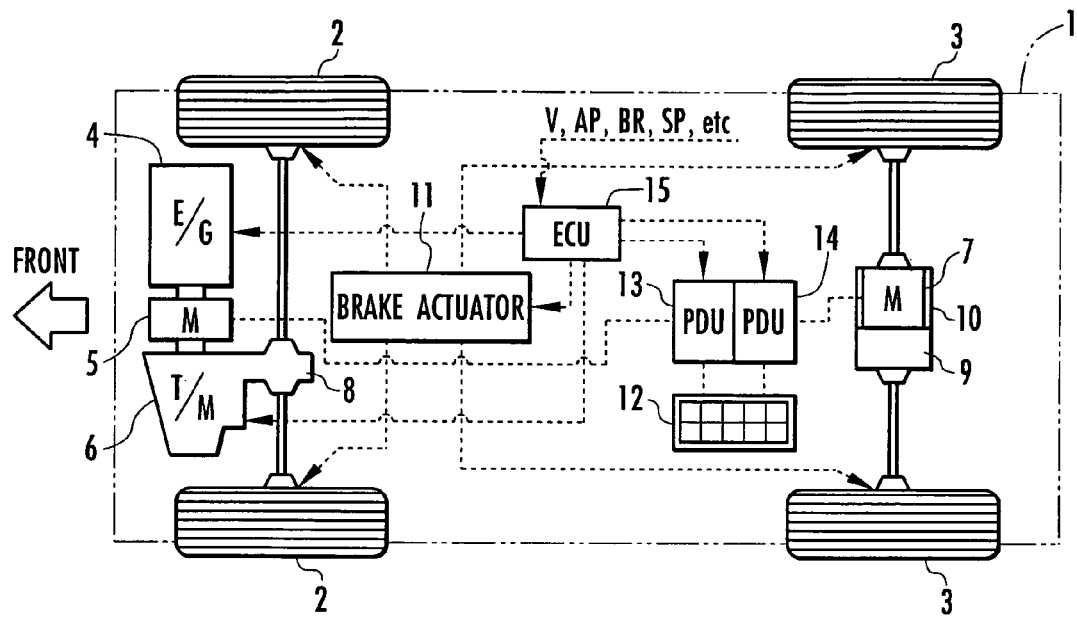
FIG. 1 is a block diagram schematically showing a general construction of a hybrid vehicle according to a first embodiment of the present invention.

A first embodiment according to the present invention will be described with reference to FIG. 1 to FIG. 11. FIG. 1 is a block diagram schematically showing a general construction of a hybrid vehicle in accordance with the present embodiment. As shown in the figure, a hybrid vehicle 1 has a pair of front wheels 2 and a pair of rear wheels 3. An engine 4, a first generator-motor 5, and a transmission 6 are provided adjacently to the front wheels 2 and 2, while a second generator-motor 7 is provided adjacently to the rear wheels 3 and 3. The first generator-motor 5 is disposed between the engine 4 and the transmission 6, and its rotor is coaxially connected with an output shaft 4a of the engine 4 and an input shaft 6a of the transmission 6 so that the rotor can be rotated together as one piece with the output shaft 4a and the input shaft 6a. An output end of the transmission 6 is joined to the front wheels 2 and 2 through the intermediary of a differential gear unit 8 so as to be capable of appropriately changing the torque imparted to the input shaft 6a from the engine 4 and/or the first generator-motor 5 and then transmitting it to the front wheels 2 and 2. In this case, when a braking torque (regenerative torque) is produced in the first generator-motor 5, the regenerative torque is transmitted to the engine 4 and also transmitted to the front wheels 2 and 2 through the intermediary of the transmission 6 and the differential gear unit 8.

In the present embodiment, the rotor of the first generator-motor 5 is coaxially connected to the output shaft 4a of the engine 4 and the input shaft 6a of the transmission 6. Alternatively, however, the rotor may be connected to the output shaft 4a and the input shaft 6a through the intermediary of a rotation transmitting means constructed of a gear mechanism or the like.

A rotor of the second generator-motor 7 is joined to the rear wheels 3 and 3 through the intermediary of a rotation transmitting device 9 and a differential gear unit 10 in this order. In this case, although details are not shown, the rotation transmitting device 9 is constructed of, for example, a gear secured to the rotor of the second generator-motor 7 and an input gear of the differential gear unit 10 meshed with the gear, and the rotation transmitting device 9 has higher torque transmitting efficiency than that of the transmission 6 having a plurality of clutch mechanisms or the like to perform gear shifting. In this case, when a braking torque or a regenerative torque is produced in the second generator-motor 7, the braking torque is transmitted to the rear wheels 3 and 3 through the intermediary of the rotation transmitting device 9 and the differential gear unit 10.

The front wheels 2 and the rear wheels 3 (hereinafter referred to simply as the wheels 2 and 3 unless they need to be discriminated) are provided with brake devices (not shown) driven by a hydraulic brake actuator 11. The brake devices are friction type adapted to apply a braking force to the wheels 2 and 3 by a frictional force, and are constructed of publicly known disc brakes or drum brakes or the like.

The vehicle 1 has electric components described below in addition to the mechanical components described above. More specifically, the vehicle 1 includes a battery 12 serving as a power source of the first generator-motor 5 and the second generator-motor 7, a drive circuit or a power drive unit 13 for transferring electric power between the battery 12 and the first generator-motor 5 and a power drive unit or a power drive unit 14 for transferring electric power between the battery 12 and the second generator-motor 7, and a control unit 15 (hereinafter referred to as "the ECU 15") composed of an electric circuit including a microcomputer. The ECU 15 has a feature for controlling the operation of the engine 4 through the intermediary of a throttle valve actuator or a fuel injector, and an igniter, which are not shown, a feature for controlling the gear shifting operation of the transmission 6 through the intermediary of an actuator, which is not shown, and a feature for controlling the generator-motors 5 and 7 through the intermediary of their associated drive circuits 13 and 14, respectively, these features being composed of programs or the like mounted thereon. The ECU 15 is adapted to receive, through sensors (not shown), a variety of detection data, including a speed (vehicle speed) V of the vehicle 1, an operating amount of an accelerator pedal (hereinafter referred to as "the accelerator operating amount AP), an operating amount of a brake pedal BR (hereinafter referred to as "the brake operation amount BR"), and a gear shift position of the transmission 6 (shift position) SP, as reference data for carrying out the control processing. Although not shown, the detection data includes a remaining capacity amount of the battery 12, the rotational speeds of the generator-motors 5 and 7, a yaw rate of the vehicle, a steering amount, and the rotational speeds of the wheels 2 and 3.

The ECU 15 has features of the first permissible maximum braking torque setting device, the first permissible braking torque setting device, the target deceleration force setting device, the target braking torque determiner, and the controller in the present invention.

An operation of the hybrid vehicle 1 according to the present embodiment, especially the operation for slowing down the vehicle, will now be explained in detail. The ECU 15 carries out the processing illustrated by the flowchart of FIG. 2 at a predetermined control processing cycle.

The ECU 15 first determines in whether the vehicle 1 is slowing down (STEP1). This is determined on the basis of, for example, a changing rate of an accelerator operation amount AP, and if the changing rate is a predetermined value or more on a deceleration side of AP, then it is determined that the vehicle 1 is decelerating. If it is determined that the vehicle 1 is not decelerating, then the program proceeds to STEP8 to carry out control processing for a non-regenerative mode of the generator-motors 5 and 7. In the control processing for the non-regenerative mode, the control processing mainly for actuating the generator-motors 5 and 7 to generate drive torques or powering torques is carried out, as appropriate, to primarily accelerate the vehicle 1.

If it is determined in STEP1 that the vehicle 1 is slowing down, then the ECU 15 determines whether the accelerator operation amount AP is zero (STEP2). If the determination result is affirmative, then it is further determined whether the remaining capacity amount of the battery 12 is smaller than a predetermined value, that is, whether the remaining capacity amount is small (STEP3). At this time, if AP≠0 (AP>0) or the remaining capacity amount ≧ the predetermined value, then the program proceeds to STEP7 to carry out control processing for non-regenerative mode in which no regeneration, that is, power generation, of the generator-motors 5 and 7 are not performed. In this control processing, it is decided that the generator-motors 5 and 7 are in a non-energized state or a state wherein the generator-motors 5 and 7 do not generate any torques.

If the determination results of STEP2 and STEP3 are both affirmative, then the ECU 15 determines whether the vehicle 1 is traveling straight (STEP4). This is determined on the basis of, for example, a steering angle of a steering wheel (not shown) of the vehicle 1 or a detection value of a yaw rate of the vehicle 1. If the determination result of STEP4 is affirmative, then the ECU 15 carries out control processing of a rear-based regenerative mode, which will be discussed hereinafter, in STEP5. If the determination result of STEP4 is negative, then the ECU 15 carries out control processing of a standard regenerative mode, which will be discussed hereinafter, in STEP6.

The rear-based regenerative mode and the standard regenerative mode will now be outlined. Both these regenerative modes are operational modes in which the regenerative operation of both or one of the first generator-motor 5 and the second generator-motor 7 is performed to convert the kinetic energy of the vehicle 1 at the time of deceleration into electric energy, and then charge the battery 12 with the electric energy. In this operational mode, to achieve highest possible efficiency of converting the kinetic energy of a vehicle into electric energy, it is desirable to convert the kinetic energy of the vehicle 1 into power generating energy primarily by the second generator-motor 7, which exhibits higher efficiency than the first generator-motor 5 in transmitting torques to and from the wheels 2 or 3. More specifically, if the first generator-motor 5 were primarily used to perform the energy conversion, the kinetic energy of the vehicle 1 would tend to incur energy loss in the transmission 6 before it is transmitted from the front wheels 2 and 2 to the first generator-motor 5, and a part of the kinetic energy would be absorbed by the engine 4. For this reason, the conversion of the kinetic energy of the vehicle 1 into electric energy is preferably performed mainly by the second generator-motor 7 having higher efficiency of torque transmission to the rear wheels 3 and 3.

Thus, in the present embodiment, the kinetic energy of the vehicle 1 is converted into electric energy by the regenerative operation of the second generator-motor 7 as much as possible to charge the battery 12 in the rear-based regenerative mode. In other words, the rear-based regenerative mode is an operational mode in which the braking force required for the vehicle 1 is secured by the braking torque (regenerative torque) imparted to the rear wheels 3 and 3 from the second generator-motor 7 by the regenerative operation of the second generator-motor 7 as much as possible.

However, in the aforementioned rear-based regenerative mode, the braking force of the vehicle 1 tends to be concentrated toward the rear wheel 3. Hence, when the vehicle 1 turns, the braking forces of the front wheels 2 and the rear wheels 3 are desirably balanced to braking forces based on a weight distribution (longitudinal weight distribution) of the vehicle 1. For this reason, in the present embodiment, the regenerative operation of both or one of the first and second generator-motors 5 and 7, respectively, is performed in the standard regenerative mode, while securing maximized balance in the braking forces of the front wheels 2 and the rear wheels 3.

According to the present embodiment, in both the rear-based regenerative mode and the standard regenerative mode, the braking force required by the vehicle 1 is secured by the braking torque (regenerative torque) produced by the first generator-motor 5 and/or the second generator-motor 7 as much as possible so as to minimize the frequency of use of the friction type braking mechanisms of the wheels 2 and 3.

Figure 3:
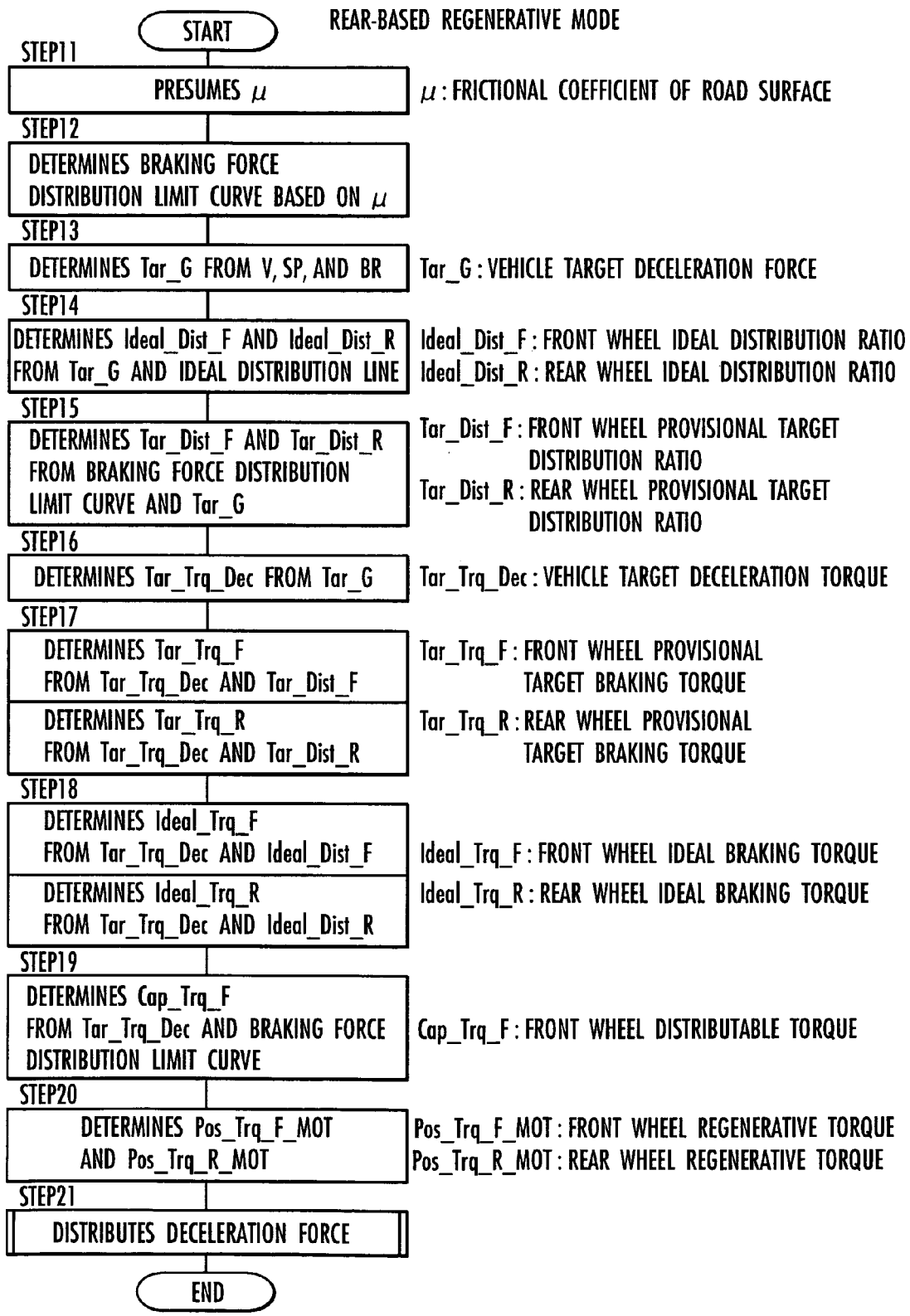
FIG. 3 is a flowchart showing control processing in a rear-based regenerative mode in the flowchart of FIG. 2.

Based on the outlines of the rear-based regenerative mode and the standard regenerative mode explained above, control processing in the operational modes will now be explained in detail. First, the control processing in the rear-based regenerative mode is carried out as illustrated by the flowchart of FIG. 3.

The ECU 15 first carries out processing for estimating a friction coefficient μ of a road surface in STEP11. Various techniques for estimating the friction coefficient μ are publicly known, e.g., the one disclosed in U.S. Pat. No. 3,059,826 and Japanese Examined Utility Model Publication No. 6-18276, so that the value μ can be estimated using such known techniques. When, for example, the technique described in U.S. Pat. No. 3,059,826 is applied, slippage rates of the wheels 2 and 3 are determined on the basis of the rotational speeds of the wheels 2 and 3 and an estimated speed of the vehicle obtained from an acceleration sensor output (a detection value of acceleration/deceleration speed of the vehicle) or the like, and then the friction coefficient μ is estimated from the determined slippage rate and the detection value of the acceleration/deceleration speed of the vehicle. The friction coefficient μ indicates a road surface condition.

Subsequently, the ECU 15 determines in STEP 12 braking force distribution curves denoted by reference characters a1 and a2 shown in FIG. 4 on the basis of the estimated μ. The braking force distribution curves indicate a distribution ratio of a permissible limit of a braking force that can be imparted to the front wheels 2 and 2 or the rear wheels 3 and 3 without causing the wheels 2 or 3 to slip in a total braking force of the vehicle 1, that is, a total sum of the braking force of the vehicle 1 generated by the front wheels 2, 2 and the braking force of the vehicle 1 generated by the rear wheels 3, 3. The curves change according to the value of the friction coefficient μ. The braking force distribution curves a1 and a2 in FIG. 4 typically illustrate the braking force distribution curves corresponding to mutually different values of μ, namely, μ1 and μ2 (μ1>μ2).

Figure 4:
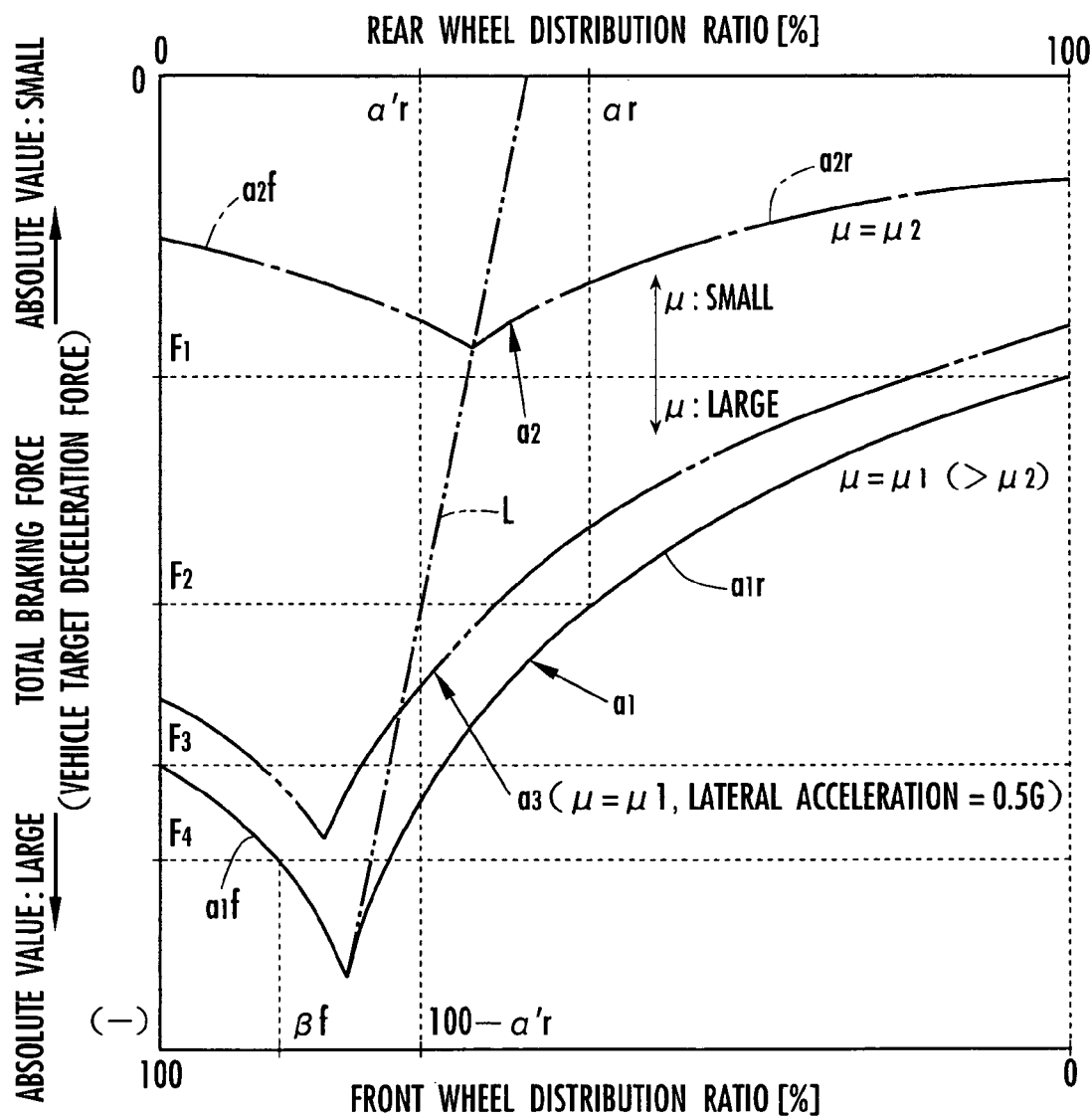
FIG. 4 is a graph for explaining essential processing of the flowchart of FIG. 3.

FIG. 4 also shows a braking force distribution curve denoted by a reference character a3, which will be discussed hereinafter. In FIG. 4, the axis of ordinates indicates the total braking force, while the axis of abscissas indicates a rear wheel distribution ratio or a front wheel distribution ratio out of a total braking force. In this case, regarding the total braking force, the force (acceleration force) in an advancing direction of the vehicle 1 is defined as a positive force, so that the total braking force<0. Furthermore, the total braking force is proportional to an acceleration (<0) in the decelerating direction of the vehicle, so that the acceleration in the decelerating direction may be used in place of the total braking force.

The braking force distribution curves a1 and a2 are formed of segments a1r and a2r, respectively, which rise rightward, and segments a1f and a2f, respectively, which rise leftward. The segments a1r and a2r, which rise rightward indicate permissible limits of proportions assumed by the rear wheels 3 in a total braking force. At an arbitrary value of the total braking force, if the proportion shared by the rear wheels 3 in the total braking force is smaller than a value of the distribution ratio on the a1r and a2r, which rise rightward, then the rear wheels 3 and 3 will not slip, that is, a rolling frictional force is secured for the rear wheels 3 and 3, indicating that the braking force can be produced by the rear wheels 3. For instance, when μ=μ1 and the total braking force is F2[N], if the rear wheel distribution ratio of the total braking force F2 is not more than a value αr [%] in F2 of the segment a1r rising rightward of the braking force distribution curve a1 (rear wheel braking force≦F2·αr/100), then a braking force can be generated by the rear wheels 3 and 3 without causing the rear wheels 3 and 3 to slip. When, for example, μ=μ1 and if the total braking force is smaller than an absolute value of F1 in the figure (0>total braking force>F1), then all (100%) of the total braking force F1 can be generated by the rear wheels 3 without causing the rear wheels 3 and 3 to slip. In this example, F1 denotes the value of a total braking force at which an absolute value is minimum among the values of total braking force on the segment a1r rising rightward of the braking force distribution curve a1.

The segments rising leftward a1f and a2f of the individual braking force distribution curves a1 and a2 denote permissible limits of proportion shared by the front wheels 2 in a total braking force. At an arbitrary value of the total braking force, if the proportion shared by the front wheels 2 in the total braking force is smaller than a value of the distribution ratio on the a1f and a2f, which rise leftward, then it indicates that the braking force can be generated by the front wheels 2 without causing the front wheels 2 and 2 to slip, that is, a rolling frictional force is secured for the front wheels 2 and 2. For instance, when μ=μ1 and the total braking force is F4[N], if the front wheel distribution ratio of the total braking force F4 is not more than a value βf [%] in F4 of the segment a1f rising leftward of the braking force distribution curve a1 (front wheel braking force≦F4 ·βf/100), then a braking force can be generated by the front wheels 2 without causing the front wheels 2 and 2 to slip. When, for example, μ=μ1 and if the total braking force is smaller than an absolute value of F3 (0>total braking force>F3), then all (100%) of the total braking force F3 can be generated by the front wheels 2 without causing the front wheels 2 and 2 to slip. In this example, F3 denotes the value of a total braking force at which an absolute value is minimum among the values of total braking force on the segment a1f rising leftward of the braking force distribution curve a1.

In the processing of the aforementioned STEP12, the braking force distribution curves a1 and a2 described above are determined on the basis of estimated values of μ determined in the aforesaid STEP11 according to arithmetic expressions and maps or the like that are prepared in advance. More specifically, the braking force distribution curves a1 and a2 in FIG. 4 are the braking force distribution curves in a state wherein the vehicle is traveling straight, that is, in a state wherein a lateral acceleration orthogonal to the advancing direction of the vehicle 1 is substantially zero. Even if the value of μ is the same, a braking force distribution curve changes if the lateral acceleration of the vehicle 1 changes. In this case, basically, if the lateral acceleration of the vehicle 1 increases, the braking force distribution curve tends to change such that the absolute value of the total braking force on the curve decreases. For instance, when μ=μ1, if a lateral acceleration that is half a gravitational acceleration G is produced, then the braking force distribution curve changes from a1 to a3. Hence, to determine a braking force distribution curve, the lateral acceleration of the vehicle 1 may be also considered in addition to the frictional coefficient μ. However, the rear-based regenerative mode is an operational mode in a state wherein the vehicle 1 is traveling straight, so that the lateral acceleration is small and exerts little influences.

Referring to FIG. 4, a line L denotes ideal allocation showing preferred proportions of a total braking force shared by the front wheels and the rear wheels when weight distribution (specifically, longitudinal weight distribution) of the vehicle 1 is taken into account. More specifically, when proportions of a braking force to be shared by the front wheels and the rear wheels that are preferred for decelerating the vehicle 1 while securing a sufficient frictional force between the front wheels 2, 2 and the rear wheels 3, 3 and a road surface at an arbitrary value of total braking force are determined on the basis of weight distribution of the vehicle 1, the distribution ratios will be on the ideal allocation line. In the present embodiment, the line L is determined on the basis of weight distribution of the vehicle 1, and is stored and retained in a memory of the ECU 15 beforehand in the form of function expressions or data tables or the like.

Figure 5:
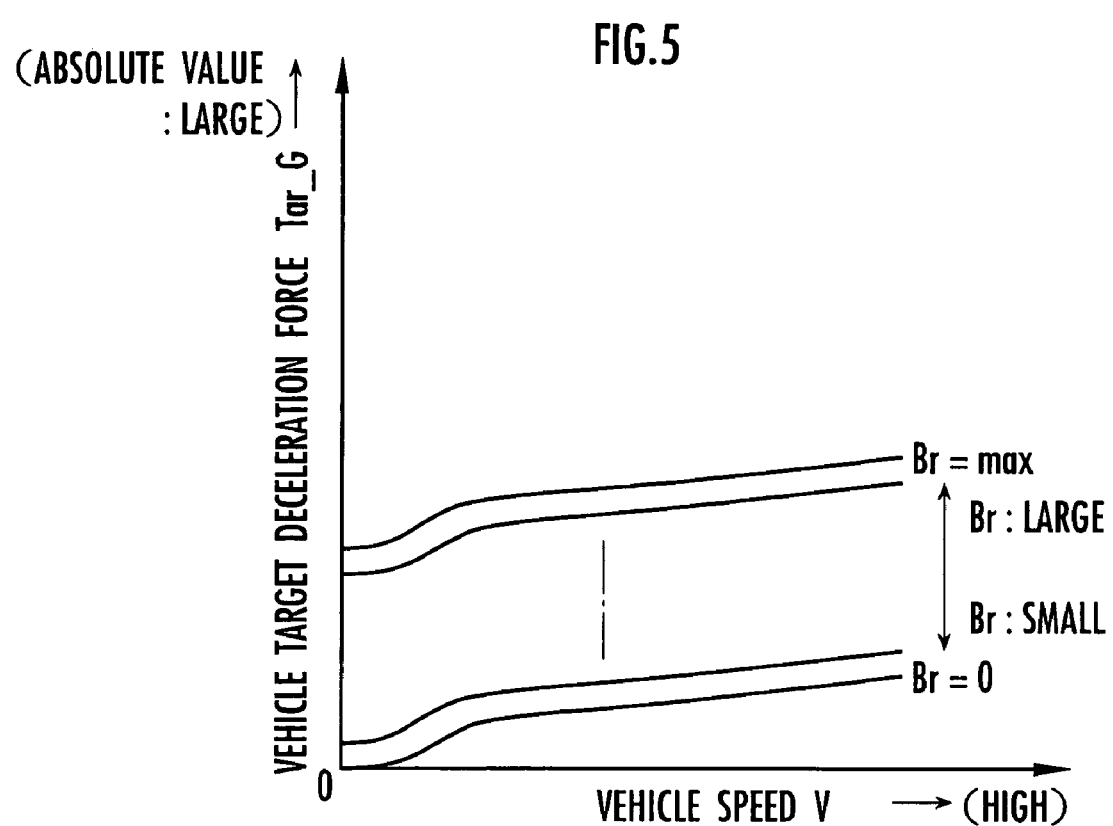
FIG. 5 is another graph for explaining the essential processing of the flowchart of FIG. 3.
Figure 6:
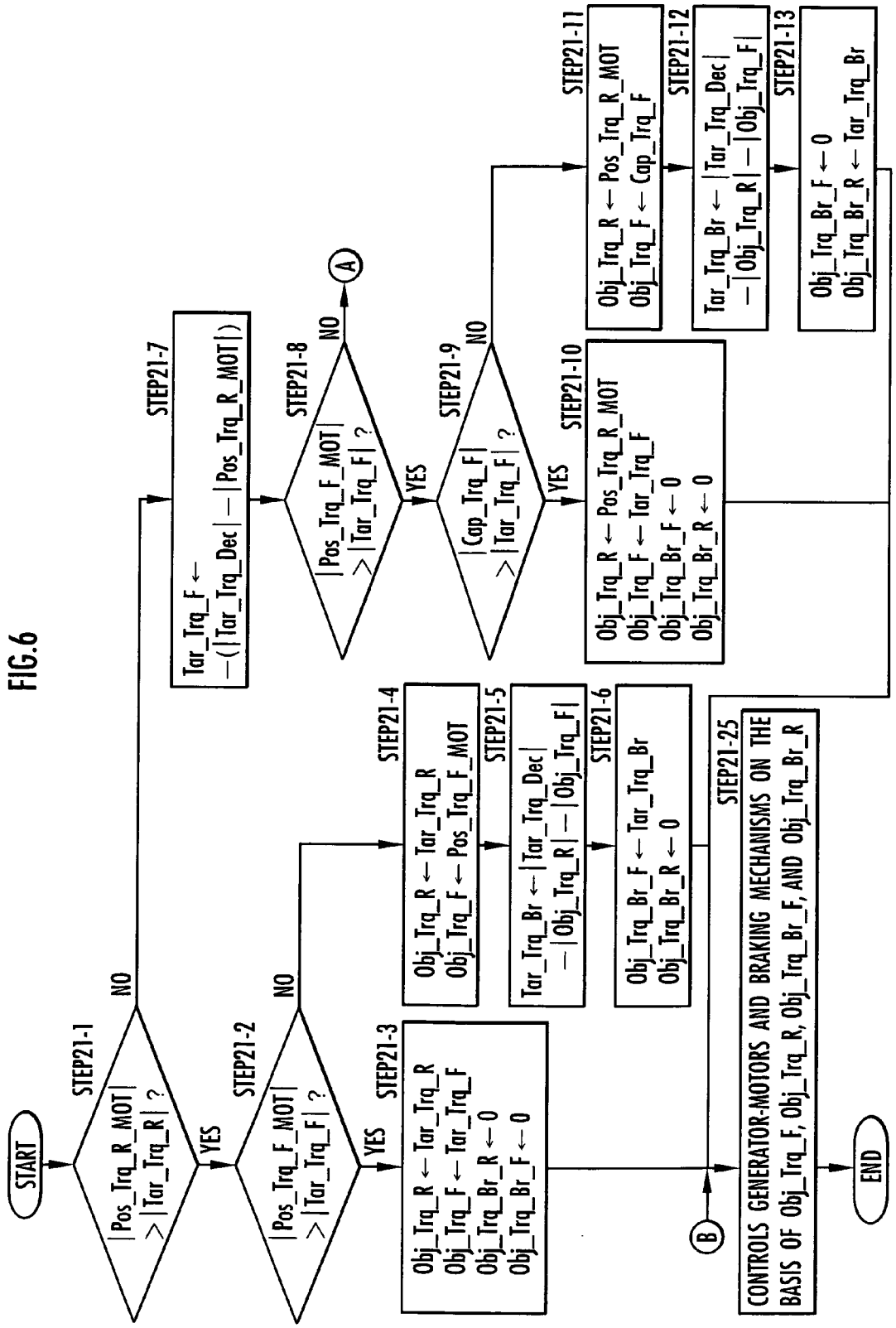
FIG. 6 is a flowchart showing a subroutine of the flowchart of FIG. 3.
Figure 7:
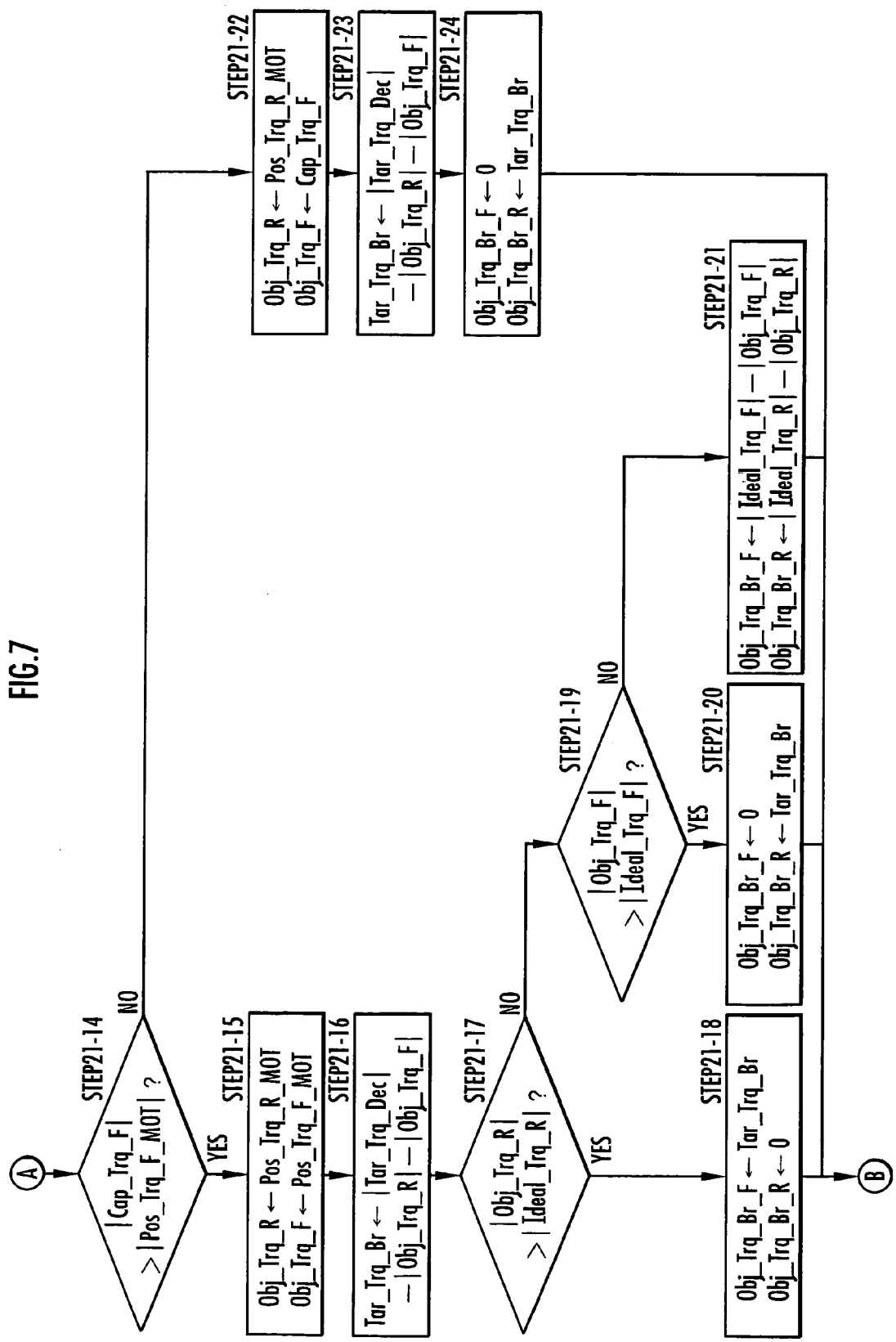
FIG. 7 is another flowchart showing a subroutine of the flowchart of FIG. 3.

Then, the ECU 15 determines in STEP13 a vehicle target decelerating force Tar_G (<0) according to, for example, a preset map shown in FIG. 5, from the current detection values of the vehicular V, the shift position SP of the transmission 6, and the brake operation amount BR. The vehicle target decelerating force Tar_G means a target value of a total braking force of the vehicle 1 (refer to FIG. 4). The map shown in FIG. 5 used to determine the Tar_G is set for each value k (1st gear, 2nd gear, . . . , 5th gear) of each shift position SP of the transmission 6. The map is basically created such that the absolute value of Tar_G increases as the value of the vehicle speed V increases and the absolute value of Tar_G increases as the brake operation amount BR increases, and that the absolute value of Tar_G increases as the value k of the shift position SP decreases, that is, as the change gear ratio is closer to a lower ratio (toward the 1st gear). When BR=0 (when no braking operation is being performed), the Tar_G is set to a deceleration force approximately equivalent to engine braking by the engine 4.

The ECU 15 then determines in STEP14 an ideal front wheel distribution ratio Ideal_Dist_F and an ideal rear wheel distribution ratio Ideal_Dist_R from the Tar_G and the aforementioned ideal distribution line L shown in FIG. 4. Referring to FIG. 4, if, for example, a total braking force is F2[N], then the ideal rear wheel distribution ratio Ideal_Dist_R will be a value αr' [%] of a rear wheel distribution ratio on the ideal distribution line L at F2, while the ideal front wheel distribution ratio Ideal_Dist_F will be a value 100-αr' [%]. Regardless of the value of the total braking force F2, an equation of Ideal_Dist_F+Ideal_Dist_R=100[%] always holds. Further, Ideal_Dist_F and Ideal_Dist_R correspond to predetermined ratios in the present invention.

The ECU 15 further determines in STEP15 a provisional front wheel target distribution ratio Tar_Dist_F and a provisional rear wheel target distribution ratio Tar_Dist_R from the braking force distribution limit curves determined in STEP12 above and the vehicle target deceleration force Tar_G. In this case, Tar_Dist_R is determined to be the value of the rear wheel distribution ratio on the braking force distribution limit curve at a current Tar_G value. In other words, Tar_Dist_R is set to a permissible limit of distribution ratio that can be shared by the rear wheels 3 and 3 without causing the rear wheels 3 and 3 to slip in a current state of friction between the rear wheels 3 and 3 and a road surface. The remaining distribution ratio is determined as Tar_Dist_F. This is represented by Tar_Dist_F=100−Tar_Dist_R [%].

A more specific example will be explained with reference to FIG. 8 through FIG. 10. At the top of each of FIG. 8 through FIG. 10, a braking force distribution curve a corresponding to a current μ value is shown in the same manner as in FIG. 4. As shown by the uppermost stage of the graph of FIG. 8, if the value of Tar_G is denoted as Fx, then an absolute value of Fx is smaller than an absolute value of a total braking force value on the segment ar rising rightward of the braking force distribution limit curve a, leading to Tar_Dist_R=100[%] and Tar_Dist_F=0[%]. Furthermore, as shown in FIG. 9 or FIG. 10, if the value of Tar_G is denoted as Fy or Fz, then the value of a rear wheel distribution ratio at a point P2 or P4 on the segment ar rising rightward of the braking force distribution limit curve a is determined as Tar_Dist_R. The point P2 in FIG. 9 and the point P4 in FIG. 10 are intersection points of the lines in the direction of axis of abscissas that have total braking force values (the values in the direction of the axis of ordinates) Fy and Fz, respectively, and the segment ar rising rightward of the braking force distribution limit curve a.

Figure 8:
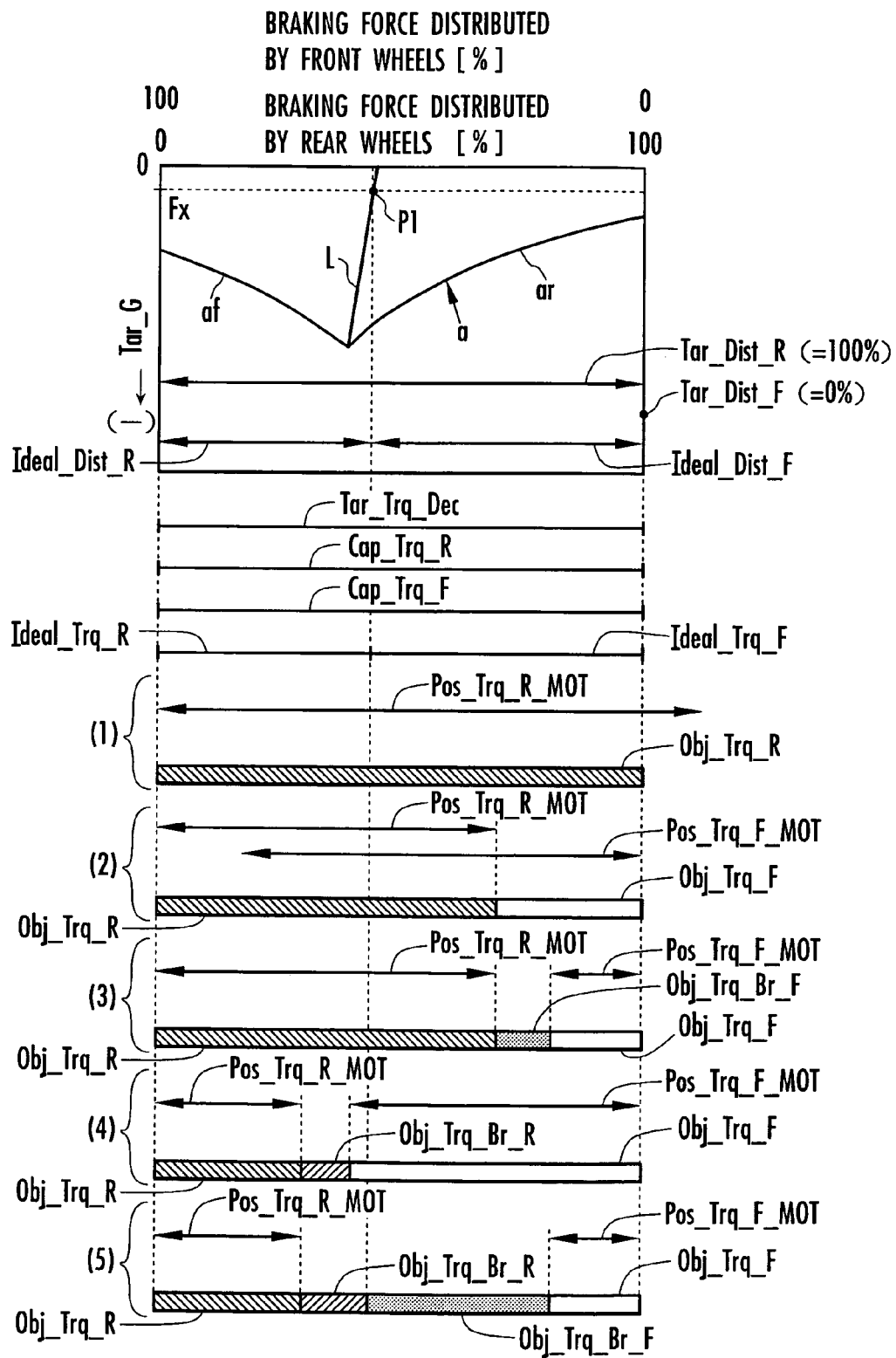
FIG. 8 is an explanatory diagram showing a setting example of braking torque in the first embodiment.
Figure 9:
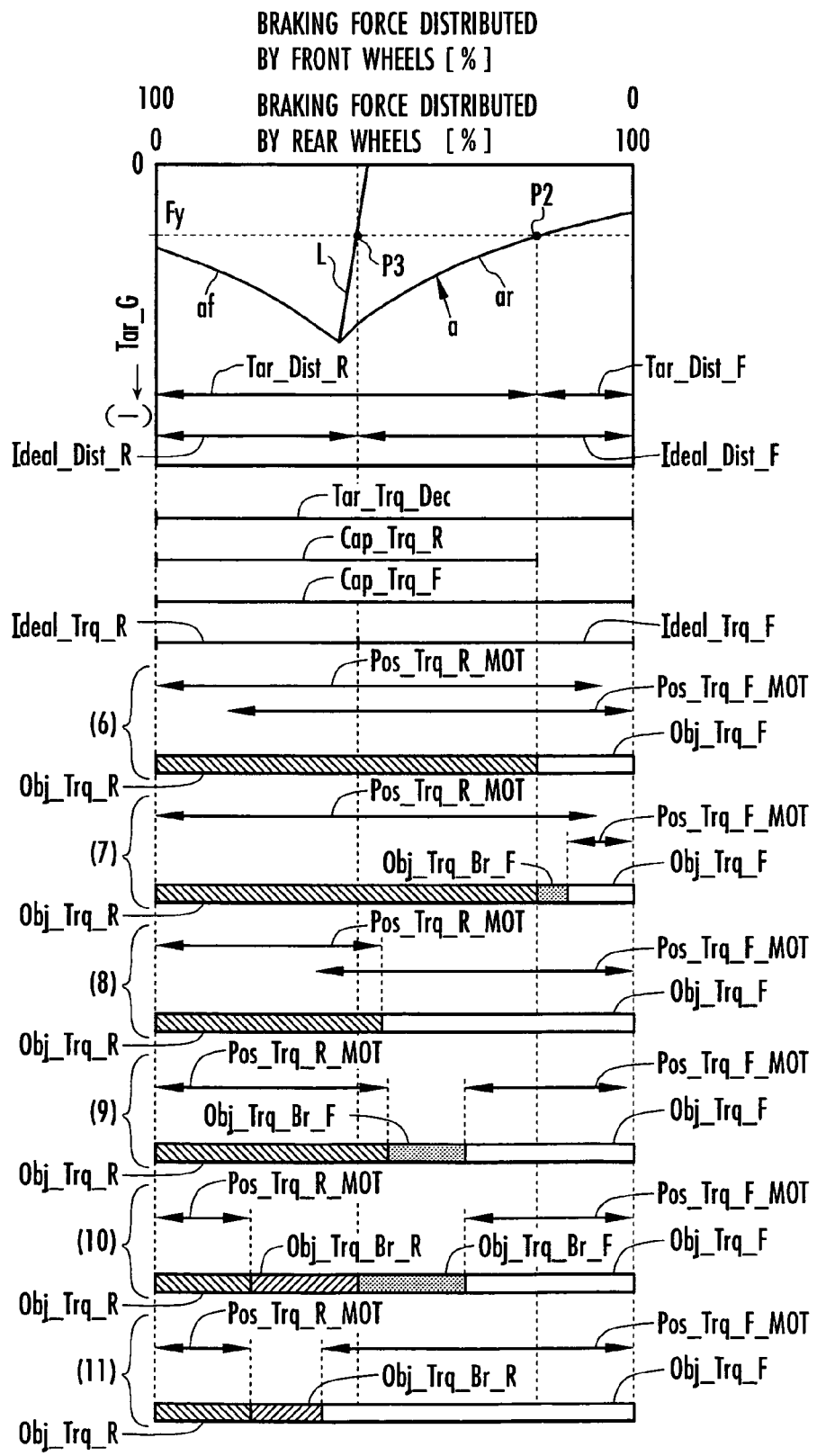
FIG. 9 is an explanatory diagram showing another setting example of braking torque in the first embodiment.
Figure 10:
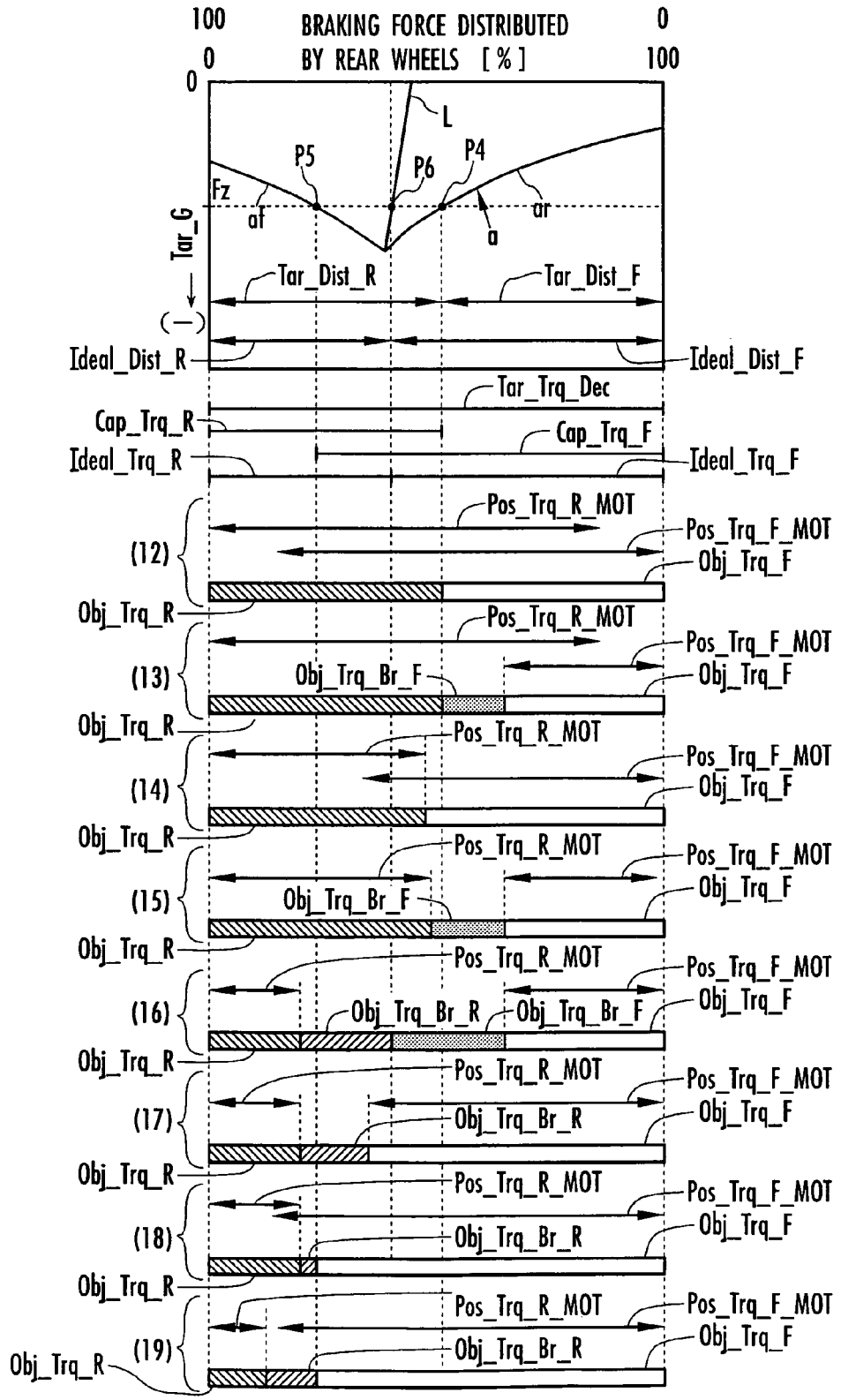
FIG. 10 is an explanatory diagram showing still another setting example of braking torque in the first embodiment.

FIG. 8 through FIG. 10 also show front wheel ideal distribution ratio Ideal_Dist_F and rear ideal distribution ratio Ideal_Dist_R that are determined for the values of Fx, Fy, and Fz of the Tar_G, respectively, in the aforesaid STEP14. As shown in FIG. 8 through FIG. 10, the values of the front wheel distribution ratio and the rear wheel distribution ratio at a point P1, P3 or P6 on the ideal distribution line L are determined as Ideal_Dist_F and Ideal_Dist_R, respectively. The point P1 in FIG. 8, the point P3 in FIG. 9, and the point P6 in FIG. 10 are intersection points of the lines in the direction of axis of abscissas that have total braking force values (the values in the direction of the axis of ordinates) Fx, Fy and Fz, respectively, and the ideal distribution line L.

Subsequently, the ECU 15 determines in STEP16 a vehicle target deceleration torque Tar_Trq_Dec from the vehicle target deceleration force Tar_G. The vehicle target deceleration torque Tar_Trq_Dec is obtained by converting the vehicle target deceleration force Tar_G into a torque to be applied to the wheels 2 and 3, and means a total sum as a target value of torque in a braking direction to be imparted to the front wheels 2, 2 and a target value of torque in the braking direction to be imparted to the rear wheels 3, 3. In the present embodiment, the direction of acceleration of the vehicle 1 is defined as the positive direction of torque to be imparted to the wheels 2 and 3, so that a relationship expressed by Tar_Trq_Dec<0 holds.

Subsequently, the ECU 15 determines in STEP 17 a provisional front wheel target braking torque Tar_Trq_F and a provisional rear wheel target braking torque Tar_Trq_R from Tar_Trq_Dec determined in the above STEP16 and Tar_Dist_F and Tar_Dist_R determined in STEP15. In this case, Tar_Trq_F and Tar_Trq_R are determined by distributing the vehicle target deceleration torque Tar_Trq_Dec to the front wheels 2 and the rear wheels 3 according to the distribution ratios of Tar_Dist_F and Tar_Dist_R. This is expressed by Tar_Trq_F=Tar_Trq_Dec×Tar_Dist$_F$/100 and Tar_Trq_R=Tar_Trq_Dec×Tar_Dist_R/100.

Further, the ECU 15 determines in STEP18 a front wheel ideal braking torque Ideal_Trq_F and a rear wheel ideal braking torque Ideal_Trq_R from Tar_Trq_Dec determined in the above STEP16 and Ideal_Dist_F and Ideal_Dist_R determined in the above STEP14. In this case, Ideal_Trq_F and Ideal_Trq_R are determined by distributing the vehicle target deceleration torque Tar_Trq_Dec to the front wheels 2 and the rear wheels 3 according to the distribution ratios of Ideal_Dist_F and Ideal_Dist_R. This is expressed by Ideal_Trq_F=Tar_Trq_Dec×Ideal_Dist_F/100 and Ideal_Trq_R=Tar_Trq_Dec×Ideal_Dist_R/100.

The ECU 15 then determines in STEP19 a front wheel distributable torque Cap_Trq_F from Tar_Trq_Dec determined in STEP16 and the braking force distribution limit curves determined in STEP12. The Cap_Trq_F means a part of the vehicle target deceleration torque Tar_Trq_Dec and this partial torque can be distributed to the front wheels 2 and 2 without causing slippage of the front wheels 2 and 2 (while securing rolling friction between the front wheels 2, 2 and a road surface). The Cap_Trq_F corresponds to a permissible maximum value of the distribution ratio of the front wheels that is determined by the segment rising leftward of the braking force distribution limit curve and the value of the vehicle target deceleration force Tar_G. Hence, Cap_Trq_F is determined by multiplying the permissible maximum value of the front wheel distribution ratio in the currently set vehicle target deceleration force Tar_G by Tar_Trq_Dec.

For example, in the case described in conjunction with FIG. 8, the case where Tar_G=Fx, or in the case described in conjunction with FIG. 9, namely, the case where Tar_G=Fy, the permissible maximum value of the front wheel distribution ratio is 100[%]; therefore, Cap_Trq_F=Tar_Trq_Dec, as illustrated at the bottom of the uppermost stage of the graph in FIG. 8 or FIG. 9. In the case shown in FIG. 10, namely, in the case where Tar_G=Fz, the permissible maximum value of the front wheel distribution ratio is the value of the front wheel distribution ratio at a point P5 on the segment rising leftward af of the braking force distribution limit curve a shown in FIG. 10; therefore, if this value is denoted as β[%], then Cap_Trq_F=Tar_Trq_Dec×β/100.

In STEP16, of the vehicle target deceleration torque Tar_Trq_Dec, the rear wheel distributable torque (hereinafter denoted by a reference character Cap_Trq_R), which is the torque that can be assumed by the rear wheels 3 and 3 without causing the rear wheels 3 and 3 to slip, is not determined. This torque is equal to the above rear wheel provisional target braking torque Tar_Trq_R in the present embodiment.

Supplementally, in the present embodiment, the braking force of the front wheels 2, 2 and the braking force of the rear wheels 3, 3 are basically generated by the regenerative operation of the first generator-motor 5 and the regenerative operation of the second generator-motor 7, respectively. Hence, the front wheel distributable torque Cap_Trq_F will correspond to a permissible maximum braking torque that can be imparted to the front wheels 2 and 2 from the first generator-motor 5 in securing a rolling frictional force of the front wheels 2 and 2. Similarly, the rear wheel distributable torque Cap_Trq_R (=Tar_Trq_R) will correspond to a permissible maximum braking torque that can be imparted to the rear wheels 3 and 3 from the second generator-motor 7 in securing a rolling frictional force of the rear wheels 3 and 3. Accordingly, Cap_Trq_F corresponds to the first permissible maximum braking torque or a mechanical permissible maximum value to be more specific in the present invention, and Cap_Trq_R (=Tar_Trq_R) corresponds to the second permissible maximum braking torque or a mechanical permissible maximum value to be more specific in the present invention.

Next, the ECU 15 determines in STEP 20 a front wheel regenerative torque Pos_Trq_F_MOT and a rear wheel regenerative torque Pos_Trq_R_MOT. Pos_Trq_F_MOT denotes a permissible maximum braking torque that can be imparted from the generator-motor 5 to the front wheels 2 and 2 by the regenerative operation of the first generator-motor 5. More specifically, Pos_Trq_F_MOT means a torque obtained by multiplying a maximum regenerative torque (the torque generated in the rotor of the first generator-motor 5) that can be electrically produced when the first generator-motor 5 itself performs its regenerative operation (supply of generated energy from the first generator-motor 5 to the battery 12) by the deceleration ratio of a system for transmitting rotation from the first generator-motor 5 to the front wheels 2 and 2. Similarly, Pos_Trq_R_MOT denotes a permissible maximum braking torque that can be imparted from the generator-motor 7 to the rear wheels 3 and 3 by the regenerative operation of the second generator-motor 7. More specifically, Pos_Trq_R_MOT means a torque obtained by multiplying a maximum regenerative torque (the torque generated in the rotor of the second generator-motor 7) that can be electrically produced when the second generator-motor 7 performs its regenerative operation (supply of generated energy from the second generator-motor 7 to the battery 12) by the deceleration ratio of a system for transmitting rotation from the second generator-motor 7 to the rear wheels 3 and 3. In this case, if the battery 12 is capable of adequately receiving the generated energy of the generator-motors 5 and 7, then the maximum regenerative torque of each of the generator-motors 5 and 7 may be the torque obtained by dividing the rated power generation output of each of the generator-motors 5 and 7 (the permissible maximum power generation outputs in the performance of each of the generator-motors 5 and 7) by a rotational speed of each of the generator-motors 5 and 7. It should be noted, however, that the regenerative electric power actually produced by the generator-motors 5 and 7 when the generator-motors 5 and 7 perform their regenerative operations is influenced by the remaining capacity of the battery 12 and also by, for example, the temperatures of the generator-motors 5 and 7 or the drive circuits 13 and 14.

Therefore, according to the present embodiment, the rated power generation outputs of the generator-motors 5 and 7 are corrected on the basis of the remaining capacity of the battery 12 and the temperatures of the generator-motors 5 and 7 or the drive circuits 13 and 14 to determine actual permissible maximum outputs of the individual generator-motors 5 and 7. Each of the obtained permissible maximum outputs is divided by the rotational speed of each of the generator-motors 5 and 7 thereby to determine the permissible maximum regenerative torque (<0) that can be electrically produced by the regenerative operation of each of the generator-motors 5 and 7. Furthermore, the permissible maximum regenerative torque of the first generator-motor 5 is multiplied by the ratio of deceleration from the first generator-motor 5 to the front wheels 2 and 2 to determine the front wheel regenerative torque Pos_Trq_F_MOT (<0). Similarly, the permissible maximum regenerative torque of the second generator-motor 7 is multiplied by the ratio of deceleration from the second generator-motor 7 to the rear wheels 3 and 3 to determine the rear wheel regenerative torque Pos_Trq_R_MOT (<0). In this case, the ratio of deceleration from the first generator-motor 5 to the front wheels 2 and 2 depends on a change gear ratio (the shift position SP) of the transmission 6. Pos_Trq_F_MOT corresponds to a first permissible maximum braking torque, or electrically permissible maximum value to be more specific, in the present invention. Similarly, Pos_Trq_R_MOT corresponds to a second permissible maximum braking torque, or electrically permissible maximum value to be more specific, in the present invention.

Then, the ECU 15 carries out in STEP21 the processing for final distribution of the vehicle target maximum deceleration force Tar_G to the front wheels 2, 2 and the rear wheels 3, 3. The processing of STEP21 is implemented according to the flowcharts shown in FIG. 6 and FIG. 7.

First, in STEP21-1, it is determined whether |Pos_Trq_R_MOT|>|Tar_Trq_R| applies, that is, whether an absolute value of the rear wheel regenerative torque Pos_Trq_R_MOT is larger than an absolute value of the rear wheel provisional target braking torque Tar_Trq_R. If the determination result is affirmative, then it is further determined in STEP21-2 whether |Pos_Trq_F_MOT|>|Tar_Trq_F| applies, that is, the front wheel regenerative torque Pos_Trq_F_MOT is larger than an absolute value of the front wheel provisional target braking torque Tar_Trq_F. If the determination result is affirmative, then the ECU 15 decides Tar_Trq_R as a rear wheel target braking torque Obj_Trq_R as the final target braking torque to be imparted from the second generator-motor 7 to the rear wheels 3 and 3, and decides Tar_Trq_F as a front wheel target braking torque Obj_Trq_F as the final target braking torque to be imparted from the first generator-motor 5 to the front wheels 2 and 2 (STEP21-3). Furthermore, in STEP21-3, a front wheel mechanical target braking torque Obj_Trq_Br_F as a target braking torque of the front wheels 2 and 2 of the aforementioned friction type braking mechanism (hereinafter referred to as "the mechanical braking mechanism") and a rear wheel mechanical target braking torque Obj_Trq_Br_R as a target braking torque of the rear wheels 3 and 3 are both set to zero. The torque generated by the mechanical braking mechanism is only the torque in the braking direction of the vehicle 1, so that Obj_Trq_R≦0 and Obj_Trq_F≦0.

Subsequently, the ECU 15 controls the first generator-motor 5 and the second generator-motor 7 according to Obj_Trq_F and Obj_Trq_R, respectively, determined in STEP21-3, and also controls the mechanical braking mechanism for the front wheels 2, 2 and the mechanical braking mechanism for the rear wheels 3, 3 according to Obj_Trq_Br_F and Obj_Trq_Br_R, respectively (STEP21-25). More specifically, a torque obtained by dividing Obj_Trq_F by the ratio of deceleration from the first generator-motor 5 to the front wheels 2 and 2 is defined as a target regenerative torque to be generated in the rotor of the first generator-motor 5, and the current to be supplied to the first generator-motor 5 is controlled through the intermediary of the drive circuit 13 so as to generate the above target regenerative torque, thereby performing the regenerative operation of the first generator-motor 5. Similarly, a torque obtained by dividing Obj_Trq_R by the ratio of deceleration from the second generator-motor 7 to the rear wheels 3 and 3 is defined as a target regenerative torque to be generated in the rotor of the second generator-motor 7, and the current to be supplied to the second generator-motor 7 is controlled through the intermediary of the drive circuit 14 so as to generate the above target regenerative torque, thereby performing the regenerative operation of the second generator-motor 7. The mechanical braking mechanism for the front wheels 2, 2 and the mechanical braking mechanism for the rear wheels 3, 3 are controlled through the intermediary of the brake actuator 11 such that these mechanical braking mechanisms produce Obj_Trq_Br_F and Obj_Trq_Br_R.

In STEP21-3, Obj_Trq_Br_F=Obj_Trq_Br_R=0; in this case, therefore, the mechanical braking mechanisms of the wheels 2 and 3 are maintained in a non-operative state for the front wheels 2, 2 and the rear wheels 3, 3 (no braking forces are imparted to the wheels 2 and 3) in this case.

Examples of Obj_Trq_F and Obj_Trq_R determined in the above STEP21-3 are shown in (1) of FIG. 8, (6) of FIG. 9 and (12) of FIG. 10. In any one of these examples, |Cap_Trq_R|<|Pos_Trq_R_MOT|(Cap_Trq_R=Tar_Trq _R) applies, so that Obj_Trq_R will be identical to Cap_Trq_R, and the remaining portion (zero in the case shown in FIG. 8) of the vehicle target deceleration torque Tar_Trq_Dec after subtracting Obj_Trq_R therefrom will be Obj_Trq_F. Thus, a vehicle target deceleration torque Tar_Trq_Dec will be provided only by the regenerative operation of the first generator-motor 5 and the second generator-motor 7. Further, Obj_Trq_R will be a maximum braking torque within the range in which the rolling friction of the rear wheels 3 and 3 can be secured.

If the determination result of the above STEP21-2 is negative, then the second generator-motor 7 is capable of electrically producing a regenerative torque corresponding to Tar_Trq_R, while the first generator-motor 5 is not capable of electrically producing a regenerative torque corresponding to Tar_Trq_F. In this case, therefore, the ECU 15 sets Tar_Trq_R to the rear wheel target braking torque Obj_Trq_R, while it sets Pos_Trq_F_MOT, whose absolute value is smaller than Tar_Trq_F, as a front wheel target braking torque Obj_Trq_F (STEP21-4).

At this time, the sum of the absolute value of the rear wheel target braking torque Obj_Trq_R and the absolute value of the front wheel target braking torque Obj_Trq_F is below the absolute value of the vehicle target deceleration torque Tar_Trq_Dec. Therefore, the value obtained by subtracting the above sum from |Tar_Trq_Dec| is set as a mechanical target total braking torque Obj_Trq_Br taken as a target value of a total braking torque generated by the mechanical braking mechanism (STEP21-5). In other words, Obj_Trq_Br is determined so that a part of the vehicle target deceleration torque Tar_Trq_Dec that cannot be supplied by the regenerative operation of the two generator-motors 5 and 7 is supplied by the mechanical braking mechanism.

In this case, the rear wheel target braking torque Obj_Trq_R is equal to a rear wheel distributable torque Cap_Trq_R (=Tar_Trq_R), which is a permissible limit in securing the rolling friction of the rear wheels 3 and 3, so that it is not desirable to actuate the mechanical braking mechanism for the rear wheels 3 and 3. The ECU 15 therefore sets Obj_Trq_Br, which has been set in STEP21-5, as a front wheel mechanical target braking torque Obj_Trq_Br_F and also sets the rear wheel mechanical target braking torque Obj_Trq_Br_R to zero (STEP21-6). Thereafter, the ECU 15 carries out the processing in the aforesaid STEP21-25 to control the first generator-motor 5 and the second generator-motor 7 on the basis of Obj_Trq_F and Obj_Trq_R and also to control the mechanical braking mechanism for the front wheels 2, 2 and the mechanical braking mechanism for the rear wheels 3, 3 on the basis of Obj_Trq_Br_F and Obj_Trq_Br_R. In this case, Obj_Trq_Br_R=0, so that the mechanical braking mechanism for the rear wheels 3 and 3 is maintained in the non-operative state.

Examples of Obj_Trq_F, Obj_Trq_R, and Obj_Trq_Br_F determined in the above STEP21-4 and STEP21-6 are shown in (7) of FIG. 9 and (13) of FIG. 10. In either of these examples, |Cap_Trq_R|<|Pos_Trq_R_MOT| (Cap_Trq_R=Tar_Trq_R) applies, so that Obj_Trq_R will be identical to Cap_Trq_R. The part of the vehicle target deceleration torque Tar_Trq_Dec, which remains after subtracting Obj_Trq_R therefrom, is larger than an absolute value of the Pos_Trq_F_MOT; therefore, Obj_Trq_F will be Pos_Trq_F_MOT. Furthermore, the part of the vehicle target deceleration torque Tar_Trq_Dec that remains after subtracting Obj_Trq_R and Obj_Trq_F therefrom will be Obj_Trq_Br_F. Thus, a vehicle target deceleration torque Tar_Trq_Dec will be provided by the regenerative operation of the first generator-motor 5 and the second generator-motor 7 and the mechanical braking mechanism for the front wheels 2 and 2. Further, Obj_Trq_R will be a maximum braking torque within the range in which the rolling friction of the rear wheels 3 and 3 can be secured, while Obj_Trq_F will be a maximum braking torque that can be electrically imparted to the front wheels 2 and 2 by the regenerative operation of the first generator-motor 5. If Tar_G is Fx in FIG. 8, i.e., if Cap_Trq_R=Cap_Trq_F=Tar_Trq_Dec, then the determination result of the aforesaid STEP21-2 will not be negative. Therefore, Obj_Trq_F, Obj_Trq_R, and Obj_Trq_Br_F will not be determined in STEP21-4 and STEP21-6.

If the determination result of the above STEP21-1 is negative, then this means that the second generator-motor 7 is incapable of electrically producing a regenerative torque corresponding to Tar_Trq_R. In this case, therefore, the ECU 15 limits the braking torque to be imparted to the rear wheels 3 and 3 from the second generator-motor 7 to a rear wheel regenerative torque Pos_Trq_R_MOT, whose absolute value is smaller than Tar_Trq_R, and updates a front wheel provisional target braking torque Tar_Trq_F (<0) to the difference between the vehicle target deceleration torque Tar_Trq_Dec and the Pos_Trq_R_MOT (STEP21-7). In other words, the portion of the vehicle target deceleration torque Tar_Trq_Dec, which cannot be supplied by the regenerative operation of the second generator-motor 7, is newly defined as the front wheel provisional target braking torque Tar_Trq_F.

Subsequently, the ECU 15 determines in STEP21-8 whether |Pos_Trq_F_MOT|>|Tar_Trq_F| applies, that is, whether an absolute value of the front wheel regenerative torque Pos_Trq_F_MOT is larger than an absolute value of the front wheel provisional target braking torque Tar_Trq_F updated in STEP21-7. If the determination result is affirmative, then the ECU 15 further determines in STEP21-9 whether |Cap_Trq_F|>|Tar_Trq_F| applies, that is, whether an absolute value of the front wheel distributable torque Cap_Trq_F, which is a permissible limit of the front wheel braking torque for securing the rolling friction of the front wheels 2 and 2, is larger than an absolute value of the front wheel provisional target braking torque Tar_Trq_F updated in STEP21-7.

If the determination result is affirmative, then the ECU 15 decides Pos_Trq_R_MOT as a rear wheel target braking torque Obj_Trq_R to be imparted from the second generator-motor 7 to the rear wheels 3 and 3, and decides the current Tar_Trq_F as a front wheel target braking torque Obj_Trq_F to be imparted from the first generator-motor 5 to the front wheels 2 and 2 (STEP21-10). Furthermore, in STEP21-10, the front wheel mechanical target braking torque Obj_Trq_Br_F and the rear wheel mechanical target braking torque Obj_Trq_Br_R are both set to zero. Then, the ECU 15 carries out the processing of the aforementioned STEP21-25 to control the first generator-motor 5 and the second generator-motor 7 on the basis of Obj_Trq_F and Obj_Trq_R and also to control the mechanical braking mechanism for the front wheels 2, 2 and the mechanical braking mechanism for the rear wheels 3, 3 on the basis of Obj_Trq_Br_F and Obj_Trq_Br_R. In this case, Obj_Trq_Br_F=Obj_Trq_Br_R=0, so that the mechanical braking mechanisms for the wheels 2 and 3 are maintained in the non-operative state (no braking force is imparted to the wheels 2 and 3) on both the front wheels 2, 2 and the rear wheels 3, 3. Obj_Trq_Br_R=0, so that the mechanical braking mechanism for the rear wheels 3 and 3 is maintained in the non-operative state.

Examples of Obj_Trq_F and Obj_Trq_R determined in the above STEP21-10 are shown in (2) of FIG. 8, (8) of FIG. 9, and (14) of FIG. 10. In any one of these examples, |Cap_Trq_R|>|Pos_Trq_R_MOT|(Cap_Trq_R=Tar_Trq _R) applies, so that Obj_Trq_R will be identical to Pos_Trq_R_MOT. The portion of the vehicle target deceleration torque Tar_Trq_Dec, which remains after subtracting Obj_Trq_R therefrom, is smaller than an absolute value of the Pos_Trq_F_MOT; therefore, the remaining portion will be Obj_Trq_F. Thus, a vehicle target deceleration torque Tar_Trq_Dec will be provided only by the regenerative operation of the first generator-motor 5 and the second generator-motor 7. Further, Obj_Trq_R will be a maximum braking torque that can be electrically imparted to the rear wheels 3 and 3 by the regenerative operation of the second generator-motor 7.

If the determination result of the above STEP21-9 is negative, then this means that an absolute value of Tar_Trq_F exceeds an absolute value of the front wheel distributable torque Cap_Trq_F indicating a permissible limit in securing the rolling frictional force of the front wheels 2 and 2. Therefore, the ECU 15 sets Pos_Trq_R_MOT to the rear wheel target braking torque Obj_Trq_R and sets the Cap_Trq_F to the front wheel target braking torque Obj_Trq_F, as in the aforesaid STEP21-10.

At this time, the sum of the absolute value of Obj_Trq_R and the absolute value of Obj_Trq_F is below the absolute value of the vehicle target deceleration torque Tar_Trq_Dec. Therefore, the ECU 15 further sets the value obtained by subtracting the above sum from |Tar_Trq_Dec| as a mechanical target total braking torque Obj_Trq_Br taken as a target value of a total braking torque generated by the mechanical braking mechanism (STEP21-12). Thus, Obj_Trq_Br is determined so that the portion of the vehicle target deceleration torque Tar_Trq_Dec that cannot be supplied by the regenerative operation of the two generator-motors 5 and 7 is supplied by the mechanical braking mechanism.

In this case, the front wheel target braking torque Obj_Trq_F is equal to a front wheel distributable torque Cap_Trq_F, which is a permissible limit in securing the rolling friction of the front wheels 2 and 2, so that it is not desirable to actuate the mechanical braking mechanism for the front wheels 2 and 2. The rear wheel target braking torque Obj_Trq_R is limited to Pos_Trq_R_MOT, whose absolute value is smaller than the rear wheel distributable torque Cap_Trq_R (=Tar_Trq_R), allowing the rear wheels 3 and 3 to assume a braking force. Therefore, the ECU 15 further sets Obj_Trq_Br, which has been set in STEP21-12, as a rear wheel mechanical target braking torque Obj_Trq_Br_R and also sets the front wheel mechanical target braking torque Obj_Trq_Br_F to zero (STEP21-13). Thereafter, the ECU 15 carries out the processing in the aforesaid STEP21-25 to control the first generator-motor 5 and the second generator-motor 7 on the basis of Obj_Trq_F and Obj_Trq_R and also to control the mechanical braking mechanism for the front wheels 2, 2 and the mechanical braking mechanism for the rear wheels 3, 3 on the basis of Obj_Trq_Br_F and Obj_Trq_Br_R. In this case, Obj_Trq_Br_F=0, so that the mechanical braking mechanism for the front wheels 2 and 2 is maintained in the non-operative state.

An example of Obj_Trq_F, Obj_Trq_R, and Obj_Trq_Br_R determined in the above STEP21-11 and STEP21-13 are shown in (18) of FIG. 10. In this case, |Cap_Trq_R|>|Pos_Trq_R_MOT|(Cap_Trq_R=Tar_Trq_R) applies, so that Obj_Trq_R will be identical to Pos_Trq_R_MOT. The portion of the vehicle target deceleration torque Tar_Trq_Dec, which remains after subtracting Obj_Trq_R therefrom, is larger than an absolute value of Cap_Trq_F, although it is smaller than an absolute value of Pos_Trq_F_MOT; therefore, Obj_Trq_F will be identical to Cap_Trq_F. Furthermore, the portion of the vehicle target deceleration torque Tar_Trq_Dec that remains after subtracting Obj_Trq_R and Obj_Trq_F therefrom will be Obj_Trq_Br_R. Thus, a vehicle target deceleration torque Tar_Trq_Dec will be provided by the regenerative operation of the first generator-motor 5 and the second generator-motor 7 and the mechanical braking mechanism for the rear wheels 3 and 3. Further, Obj_Trq_R will be a maximum braking torque that can be electrically supplied to the rear wheels 3 and 3 by the regenerative operation of the second generator-motor 7, and Obj_Trq_F will be a maximum braking torque within the range in which the rolling friction of the front wheels 2 and 2 can be secured. If Tar_G is Fx in FIG. 8, i.e., Cap_Trq_R=Cap_Trq_F=Tar_Trq_Dec, or Fy in FIG. 9, i.e., Cap_Trq_F=Tar_Trq_Dec, then the determination result of the aforesaid STEP21-9 will not be negative. Therefore, Obj_Trq_F, Obj_Trq_R, and Obj_Trq_Br_R will not be determined in STEP21-11 and STEP21-13.

If the determination result of the above STEP21-8 is negative, then the ECU 15 further determines in STEP21-14 whether |Cap_Trq_F|>|Pos_Trq_F_MOT| applies, that is, whether an absolute value of the front wheel distributable torque Cap_Trq_F, which is a permissible limit of the front wheel braking torque in securing the rolling friction of the front wheels 2 and 2, exceeds an absolute value of the front wheel regenerative torque Pos_Trq_F_MOT. If the determination result is affirmative, then it means that the first generator-motor 5 is incapable of electrically producing a regenerative torque corresponding to Tar_Trq_F updated in STEP21-7, and an absolute value of Pos_Trq_F_MOT corresponding to a permissible limit of the regenerative torque that can be electrically produced by the first generator-motor 5 is smaller than the absolute value of the front wheel distributable torque Cap_Trq_F. Hence, the rolling frictional force of the front wheels 2 and 2 can be smoothly secured when the first generator-motor 5 generates a regenerative torque of its electrical permissible limit. In this case, therefore, the ECU 15 sets, in STEP21-15, Pos_Trq_R_MOT to the rear wheel target braking torque Obj_Trq_R, and also sets Pos_Trq_F_MOT to the front wheel target braking torque Obj_Trq_F, as in the aforementioned STEP21-10.

At this time, the sum of the absolute value of Obj_Trq_R and the absolute value of Obj_Trq_F is below the absolute value of the vehicle target deceleration torque Tar_Trq_Dec. Therefore, the ECU 15 further sets the value obtained by subtracting the above sum from |Tar_Trq_Dec| as a mechanical target total braking torque Obj_Trq_Br taken as a target value of a total braking torque generated by the mechanical braking mechanism (STEP21-12). Thus, Obj_Trq_Br is determined so that the portion of the vehicle target deceleration torque Tar_Trq_Dec that cannot be supplied by the regenerative operation of the two generator-motors 5 and 7 is supplied by the mechanical braking mechanism.

In this case, Obj_Trq_R and Obj_Trq_F will be below a rear wheel distributable torque Cap_Trq_R and a front wheel distributable torque Cap_Trq_F, respectively, so that a braking force can be produced by the mechanical braking mechanism for either one of the front wheels 2,2 and the rear wheels 3, 3. Further, in this case, Obj_Trq_R and Obj_Trq_F are the electrical permissible limits that can be applied by the generator-motors 5 and 7 to their corresponding wheels 2 and 3, respectively; therefore, their absolute values cannot be increased any further. For this reason, the ECU 15 carries out the processing for allotting Obj_Trq_Br determined in STEP21-12 as described above to the mechanical braking mechanism for the front wheels 2, 2 and the mechanical braking mechanism for the rear wheels 3, 3 in STEP21-17 through STEP21-21, as explained below.

First, in STEP21-17, it is determined whether |Obj_Trq_R|>|Ideal_Trq_R| applies, i.e., whether the absolute value of Obj_Trq_R exceeds the absolute value of the rear wheel ideal braking torque Ideal_Trq_R determined in the above STEP18 (refer to FIG. 3). If the determination result is affirmative, then the mechanical target total braking torque Obj_Trq_Br determined previously is set as the front wheel mechanical target braking torque Obj_Trq_Br_F, while the rear wheel mechanical target braking torque Obj_Trq_Br_R is set to zero (STEP21-18).

If the determination result of STEP21-17 is negative, then it is further determined in STEP21-19 whether |Obj_Trq_F|>|Ideal_Trq_F| applies, i.e., whether the absolute value of Obj_Trq_F exceeds the absolute value of the front wheel ideal braking torque Ideal_Trq_F determined in the above STEP18 (refer to FIG. 3). If the determination result is affirmative, then the mechanical target total braking torque Obj_Trq_Br determined previously is set as the rear wheel mechanical target braking torque Obj_Trq_Br_R, while the front wheel mechanical target braking torque Obj_Trq_Br_F is set to zero (STEP21-20).

Further, if the determination result of STEP21-19 is negative, then the value obtained by subtracting the absolute value of Obj_Trq_F from the absolute value of the front wheel ideal braking torque Ideal_Trq_F is set as a front wheel mechanical target braking torque Obj_Trq_Br_F, and the value obtained by subtracting the absolute value of Obj_Trq_R from the absolute value of the rear wheel ideal braking torque Ideal_Trq_R is set as a rear wheel mechanical target braking torque Obj_Trq_Br_R (STEP21-21).

As described above, the Obj_Trq_Br_F and the Obj_Trq_Br_R are determined in STEP21-18 or 21-20 or 21-21 brings such that the total sum of the Obj_Trq_F, which is a target value of the braking torque to be imparted to the front wheels 2 and 2 from the first generator-motor 5 and the front wheel mechanical target braking torque Obj_Trq_Br_F is brought close to the front wheel ideal braking torque Ideal_Trq_F as much as possible, and also the total sum of the Obj_Trq_R, which is a target value of the braking torque to be imparted to the rear wheels 3 and 3 from the second generator-motor 7 and the rear wheel mechanical target braking torque Obj_Trq_Br_R is brought close to the rear wheel ideal braking torque Ideal_Trq_R as much as possible. Especially when carrying out the processing of STEP21-21, the total sum of the braking torques to be imparted to the front wheels 2 and 2 agrees with Ideal_Trq_F, and the total sum of the braking torques to be imparted to the rear wheels 3 and 3 agrees with Ideal_Trq_R.

After carrying out the processing of STEP21-17 through STEP21-21 as described above, the ECU 15 further carries out the processing the aforementioned STEP21-25 to control the first generator-motor 5 and the second generator-motor 7 on the basis of Obj_Trq_F and Obj_Trq_R and also to control the mechanical braking mechanism for the front wheels 2, 2 and the mechanical braking mechanism for the rear wheels 3, 3 on the basis of Obj_Trq_Br_F and Obj_Trq_Br_R.

Examples of Obj_Trq_F, Obj_Trq_R, and Obj_Trq_Br_F determined in the above STEP21-15 and STEP21-18 are shown in (3) of FIG. 8, (9) of FIG. 9, and (15) of FIG. 10. In any one of these examples, |Cap_Trq_R|>|Pos_Trq_R_MOT|(Cap_Trq_R=Tar_Trq_R) applies, so that Obj_Trq_R will be identical to Pos_Trq_R_MOT. The portion of the vehicle target deceleration torque Tar_Trq_Dec, which remains after subtracting Obj_Trq_R therefrom, is larger than the absolute value of Pos_Trq_F_MOT, and the absolute value of Pos_Trq_F_MOT is smaller than the absolute value of Cap_Trq_F; therefore, Obj_Trq_F will be identical to Pos_Trq_F_MOT. The absolute value of Obj_Trq_R is larger than the absolute value of Ideal_Trq_R, so that the portion of the vehicle target deceleration torque Tar_Trq_Dec that remains after subtracting Obj_Trq_R and Obj_Trq_F therefrom will be Obj_Trq_Br_F. Thus, the vehicle target deceleration torque Tar_Trq_Dec will be provided by the regenerative operation of the first generator-motor 5 and the second generator-motor 7 and the mechanical braking mechanism for the front wheels 2 and 2. Further, Obj_Trq_R will be a maximum braking torque that can be electrically imparted to the rear wheels 3 and 3 by the regenerative operation of the second generator-motor 7, while Obj_Trq_F will be a maximum braking torque that can be electrically imparted to the front wheels 2 and 2 by the regenerative operation of the first generator-motor 5. Although Obj_Trq_R exceeds Ideal_Trq_R, it actuates the mechanical braking mechanism for the front wheels 2 and 2, so that the total braking torque for the front wheels 2 and 2 approaches the front wheel ideal braking torque Ideal_Trq_F, while the total braking torque for the rear wheels 3 and 3 does not exceed the rear wheel ideal braking torque Ideal_Trq_R more than necessary.

Examples of Obj_Trq_F, Obj_Trq_R, and Obj_Trq_Br_R determined in the above STEP21-15 and STEP21-20 are shown in (4) of FIG. 8, (11) of FIG. 9, and (17) of FIG. 10. In any one of these examples, |Cap_Trq_R|>|Pos_Trq_R_MOT|(Cap_Trq_R=Tar_Trq_R) applies, so that Obj_Trq_R will be identical to Pos_Trq_R_MOT. The portion of the vehicle target deceleration torque Tar_Trq_Dec, which remains after subtracting Obj_Trq_R therefrom, is larger than the absolute value of Pos_Trq_F_MOT, and the absolute value of Pos_Trq_F_MOT is smaller than the absolute value of Cap_Trq_F; therefore, Obj_Trq_F will be identical to Pos_Trq_F_MOT. The absolute value of Obj_Trq_F is larger than the absolute value of Ideal_Trq_F, so that the portion of the vehicle target deceleration torque Tar_Trq_Dec that remains after subtracting Obj_Trq_R and Obj_Trq_F therefrom will be Obj_Trq_Br_R. Thus, the vehicle target deceleration torque Tar_Trq_Dec will be provided by the regenerative operation of the first generator-motor 5 and the second generator-motor 7 and the mechanical braking mechanism for the rear wheels 3 and 3. Further, Obj_Trq_R will be a maximum braking torque that can be electrically imparted to the rear wheels 3 and 3 by the regenerative operation of the second generator-motor 7, while Obj_Trq_F will be a maximum braking torque that can be electrically imparted to the front wheels 2 and 2 by the regenerative operation of the first generator-motor 5. Although Obj_Trq_F exceeds Ideal_Trq_F, it actuates the mechanical braking mechanism for the rear wheels 3 and 3, so that the total braking torque for the rear wheels 3 and 3 approaches the rear wheel ideal braking torque Ideal_Trq_R, while the total braking torque for the front wheels 2 and 2 does not exceed the front wheel ideal braking torque Ideal_Trq_F more than necessary.

Examples of Obj_Trq_F, Obj_Trq_R, Obj_Trq_Br_F and Obj_Trq_Br_R determined in the above STEP21-15 and STEP21-21 are shown in (5) of FIG. 8, (10) of FIG. 9, and (16) of FIG. 10. In any one of these examples, |Cap_Trq_R|>|Pos_Trq_R_MOT|(Cap_Trg_R=Tar$_{13}$ Trq_R) applies, so that Obj_Trq_R will be identical to Pos_Trq_R_MOT. The portion of the vehicle target deceleration torque Tar_Trq_Dec, which remains after subtracting Obj_Trq_R therefrom, is larger than the absolute value of the Pos_Trq_F_MOT, and the absolute value of Pos_Trq_F_MOT is smaller than the absolute value of Cap_Trq_F; therefore, Obj_Trq_F will be identical to Pos_Trq_F_MOT. The absolute value of Obj_Trq_F is smaller than the absolute value of Ideal_Trq_F, while the absolute value of Obj_Trq_R is smaller than the absolute value of Ideal_Trq_R, so that the portion of the vehicle target deceleration torque Tar_Trq_Dec that remains after subtracting Obj_Trq_R and Obj_Trq_F therefrom will be allotted to Obj_Trq_Br_F and Obj_Trq_Br_R. In this case, Obj_Trq_Br_F and Obj_Trq_Br_R are determined such that the total braking torque of the front wheels 2, 2 and the total braking torque of the rear wheels 3, 3 will be Ideal_Trq_F and Ideal_Trq_R, respectively. Thus, the vehicle target deceleration torque Tar_Trq_Dec will be provided by the regenerative operation of the first generator-motor 5 and the second generator-motor 7 and the mechanical braking mechanisms for the front wheels 2, 2 and the mechanical braking mechanism for the rear wheels 3, 3. Further, Obj_Trq_R will be a maximum braking torque that can be electrically imparted to the rear wheels 3 and 3 by the regenerative operation of the second generator-motor 7, while Obj_Trq_F will be a maximum braking torque that can be electrically imparted to the front wheels 2 and 2 by the regenerative operation of the first generator-motor 5. Actuating the mechanical braking mechanisms for the front wheels 2, 2 and the rear wheels 3, 3 causes the total braking torque of the front wheels 2, 2 and the total braking torque of the rear wheels 3, 3 to agree with the front wheel ideal braking torque Ideal_Trq_F and the rear wheel ideal braking torque Ideal_Trq_R, respectively.

If the determination result of STEP21-14 is negative, then it means that the first generator-motor 5 is incapable of electrically producing a regenerative torque corresponding to Tar_Trq_F updated in STEP21-7, and an absolute value of Pos_Trq_F_MOT corresponding to a permissible limit of the regenerative torque that can be electrically produced by the first generator-motor 5 exceeds the absolute value of the front wheel distributable torque Cap_Trq_F. Hence, in this case, the ECU 15 carries out in STEP21-22 through STEP21-24 the same processing as that of the aforesaid STEP21-11 through STEP21-13. More specifically, the ECU 15 sets Pos_Trq_R_MOT as the rear wheel target braking torque Obj_Trq_R, and it sets Cap_Trq_F as the front wheel target braking torque Obj_Trq_F. Further, the ECU 15 further sets the value obtained by subtracting the sum of the absolute value of Obj_Trq_R and the absolute value of Obj_Trq_F from |Tar_Trq_Dec| as a mechanical target total braking torque Obj_Trq_Br as a target value of the total braking torque generated by the mechanical braking mechanisms, then sets the Obj_Trq_Br as the rear wheel mechanical target braking torque Obj_Trq_Br_R, and sets the front wheel mechanical target braking torque Obj_Trq_Br_F to zero. Thereafter, the ECU 15 carries out the processing of the aforementioned STEP21-25 to control the first generator-motor 5 and the second generator-motor 7 on the basis of Obj_Trq_F and Obj_Trq_R, and also control the mechanical braking mechanism for the front wheels 2, 2 and the mechanical braking mechanism for the rear wheels 3, 3 on the basis of Obj_Trq_Br_F and Obj_Trq_Br_R. In this case, Obj_Trq_Br_F=0; therefore, the mechanical braking mechanism for the front wheels 2 and 2 is maintained in the non-operative state.

Examples of Obj_Trq_F, Obj_Trq_R, and Obj_Trq_Br_R determined in the above STEP21-22 and STEP21-24 are shown in (19) of FIG. 10. In this case, |Cap_Trq_R|>|Pos_Trq_R_MOT| (Cap_Trq_R=Tar_Trq_R) applies, so that Obj_Trq_R will be identical to Pos_Trq_R_MOT. The portion of the vehicle target deceleration torque Tar_Trq_Dec, which remains after subtracting Obj_Trq_R therefrom, is larger than the absolute value of the Pos_Trq_F_MOT, and the absolute value of Pos_Trq_F_MOT is larger than the absolute value of Cap_Trq_F; therefore, Obj_Trq_F will be identical to Cap_Trq_F. The portion of the vehicle target deceleration torque Tar_Trq_Dec that remains after subtracting Obj_Trq_R and Obj_Trq_F therefrom will be Obj_Trq_Br_R Thus, the vehicle target deceleration torque Tar_Trq_Dec will be provided by the regenerative operation of the first generator-motor 5 and the second generator-motor 7 and the mechanical braking mechanisms for the rear wheels 3, 3. Further, Obj_Trq_R will be a maximum braking torque that can be electrically imparted to the rear wheels 3 and 3 by the regenerative operation of the second generator-motor 7, while Obj_Trq_F will be a maximum braking torque within a range in which the rolling friction of the front wheels 2 and 2 can be secured. If Tar_G is Fx shown in FIG. 8, i.e., Cap_Trq_R=Cap_Trq_F=Tar_Trq_Dec, or Fy shown in FIG. 9, i.e., Cap_Trq_F=Tar_Trq_Dec, then |Cap_Trq_F|>|Tar_Trq_F|≧|Pos_Trq_F_MOT| except for a case where Pos_Trq_R_MOT=0 (in this case, Obj_Trq_R=0), and the determination result of the aforesaid STEP21-14 will not be negative. Therefore, Obj_Trq_F, Obj_Trq_R, and Obj_Trq_Br_R will not be determined in STEP21-22 and STEP21-24.

The control processing explained above is for the rear-based regenerative mode. This control processing sets the rear wheel target braking torque Obj_Trq_R to be imparted to the rear wheels 3 and 3 from the second generator-motor 7 to a value of the rear wheel distributable torque Cap_Trq_R (=Tar_Trq_R) as a permissible maximum braking torque that allows the rolling friction of the rear wheels 3 and 3 to be secured or the rear wheel regenerative torque Pos_Trq_R_MOT as a permissible maximum braking torque that can be electrically imparted to the rear wheels 3 and 3 by the regenerative operation of the second generator-motor 7, whichever has a smaller absolute value. The portion of the vehicle target braking torque Tar_Trq_Dec obtained by removing or subtracting the rear wheel target braking torque Obj_Trq_R therefrom is determined as the front wheel target braking torque Obj_Trq_F to be imparted to the front wheels 2 and 2 from the first generator-motor 5 unless it exceeds a front wheel distributable torque Cap_Trq_R as a permissible maximum braking torque that allows the rolling friction of the front wheels 2 and 2 to be secured or the front wheel regenerative torque Pos_Trq_F_MOT as a permissible maximum braking torque that can be electrically imparted to the front wheels 2 and 2 by the regenerative operation of the first generator-motor 5, whichever has a smaller absolute value.

Accordingly, when the vehicle 1 is slowing down while traveling straight, a greatest possible portion of a total braking force of the vehicle 1 is generated by the regenerative operation of the second generator-motor 7. More specifically, a maximum portion of a total braking force within a range in which a rolling frictional force of the rear wheels 3 and 3 is secured and which can be electrically generated by the regenerative operation of the second generator-motor 7 is generated by the regenerative operation of the second generator-motor 7. In this case, the regenerative operation of the second generator-motor 7 allows the kinetic energy of the vehicle 1 to be converted into electric energy more efficiently than by the first generator-motor 5, permitting the energy efficiency of the vehicle 1 to be improved. Moreover, a portion of a total required braking force of the vehicle 1 that cannot be supplied by the regenerative operation of the second generator-motor 7 will be generated by the regenerative operation of the first generator-motor 5 as much as possible. More specifically, a maximum portion of a total braking force within a range in which a rolling frictional force of the front wheels 2 and 2 is secured and which can be electrically generated by the regenerative operation of the first generator-motor 5 is generated by the regenerative operation of the first generator-motor 5. This makes it possible to minimize the consumption of the kinetic energy of the vehicle 1 as heat energy, permitting higher use efficiency of the energy of the vehicle 1.

When a portion of a total required braking force of the vehicle 1 cannot be supplied by the regenerative operation of the two generator-motors 5 and 7 and the portion is supplemented by the mechanical braking mechanisms, then the proportions of the supplemental braking force to be assumed by the mechanical braking mechanism for the front wheels 2, 2 and the mechanical braking mechanism for the rear wheels 3, 3, respectively, are determined such that the total braking force of the front wheels 2, 2 and the total braking force of the rear wheels 3, 3 approach a front wheel ideal braking torque and a rear wheel ideal braking torque, respectively, as much as possible. This arrangement restrains a braking force of the vehicle 1 from being unduly deflected toward the front wheels 2, 2 or toward the rear wheels 3, 3.

Figure 11:
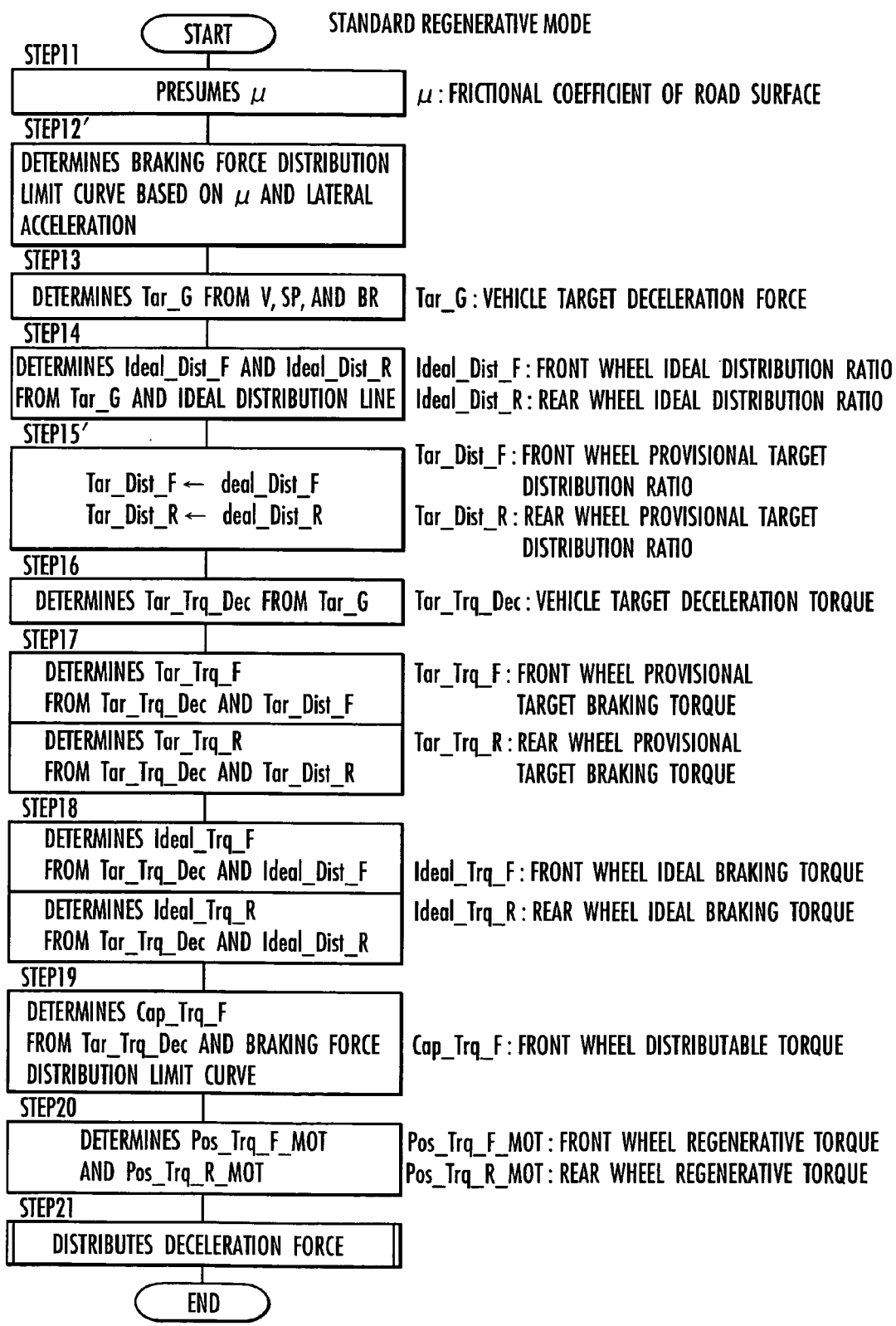
FIG. 11 is a flowchart showing control processing in a standard regenerative mode in the flowchart of FIG. 2.

The control processing in the standard regenerative mode will now be explained with reference to the flowchart shown in FIG. 11. As illustrated by the flowchart, the control processing in the standard regenerative mode differs from the control processing in the rear-based regenerative mode described above in the processing of STEP12' and STEP15'. The control processing in the standard regenerative mode is carried out when the vehicle 1 is turning. Hence, in STEP12', a lateral acceleration of the vehicle 1, which is detected using, for example, an acceleration sensor is considered in addition to an estimated value of the frictional coefficient μ, and a braking force distribution limit curve is determined using a predetermined arithmetic expression or a map or the like on the basis of the frictional coefficient μ and the lateral acceleration. In STEP15', the front wheel ideal distribution ratio Ideal_Dist_F and the rear wheel ideal distribution ratio Ideal_Dist_R determined previously in STEP14 are set as the front wheel provisional target distribution ratio Tar_Dist_F and the rear wheel provisional target distribution ratio Tar_Dist_R, respectively. The rest of the control processing is the same as that of the control processing in the rear-based regenerative mode.

The control processing in the standard regenerative mode makes it possible to cause the total braking torque of the front wheels 2, 2 and the total braking torque of the rear wheels 3, 3 to agree with or to be maintained approximate to the front wheel ideal braking torque Ideal_Trq_F and the rear wheel ideal braking torque Ideal_Trq_R, respectively. This is effective for securing the rolling frictions of the front wheels 2, 2 and the rear wheels 3, 3 and for restricting the wheels 2 and 3 from slipping.

A second embodiment according to the present invention will now be described with reference to FIG. 12 and FIG. 13. The present embodiment differs from the first embodiment only in a portion of control processing; therefore, the like components as those in the first embodiment will use the like reference numerals and drawings as those in the first embodiment, and detailed explanation will not be repeated.

The present embodiment differs from the first embodiment in that, when the control processing in the rear-based regenerative mode or the standard regenerative mode explained in the first embodiment is carried out, the wheels 2 and 3 are checked for slippage. If no slippage is detected, then the control processing in the rear-based regenerative mode is carried out. If slippage is detected, then the control processing in the standard regenerative mode is carried out.

Figure 2:
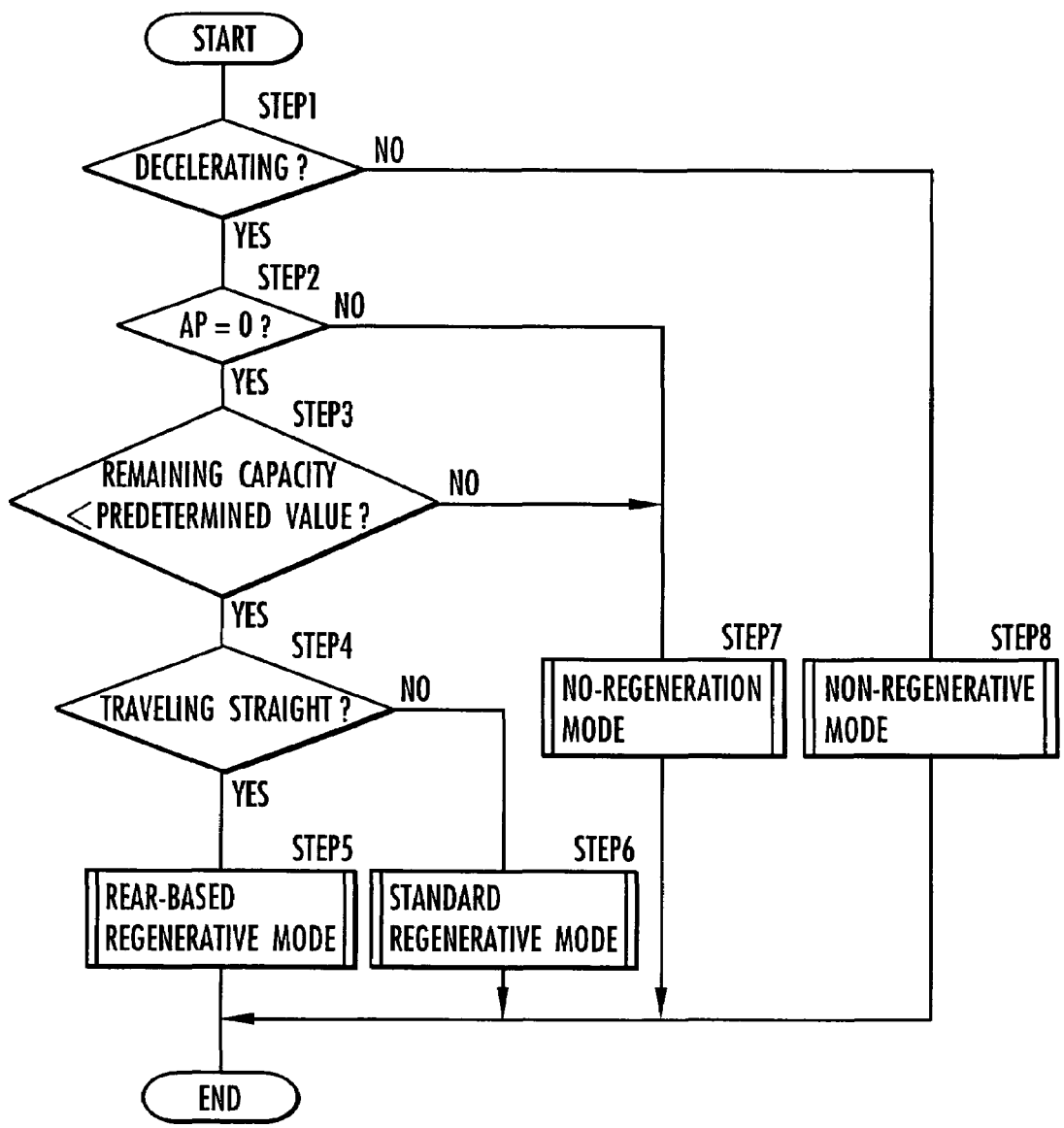
FIG. 2 is a flowchart showing control processing of the hybrid vehicle according to the first embodiment.
Figure 12:
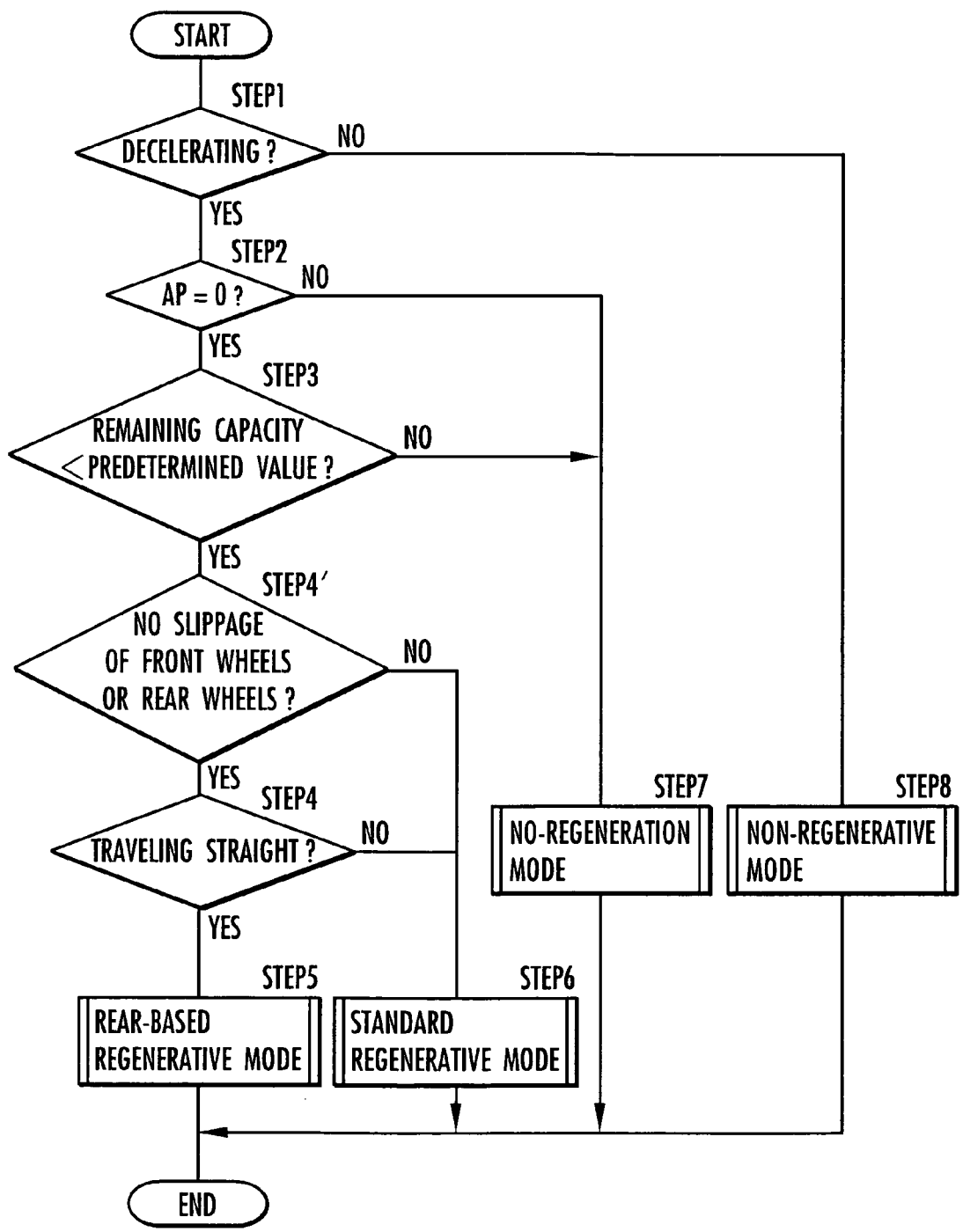
FIG. 12 is a flowchart showing control processing of a hybrid vehicle according to a second embodiment.
Figure 13:
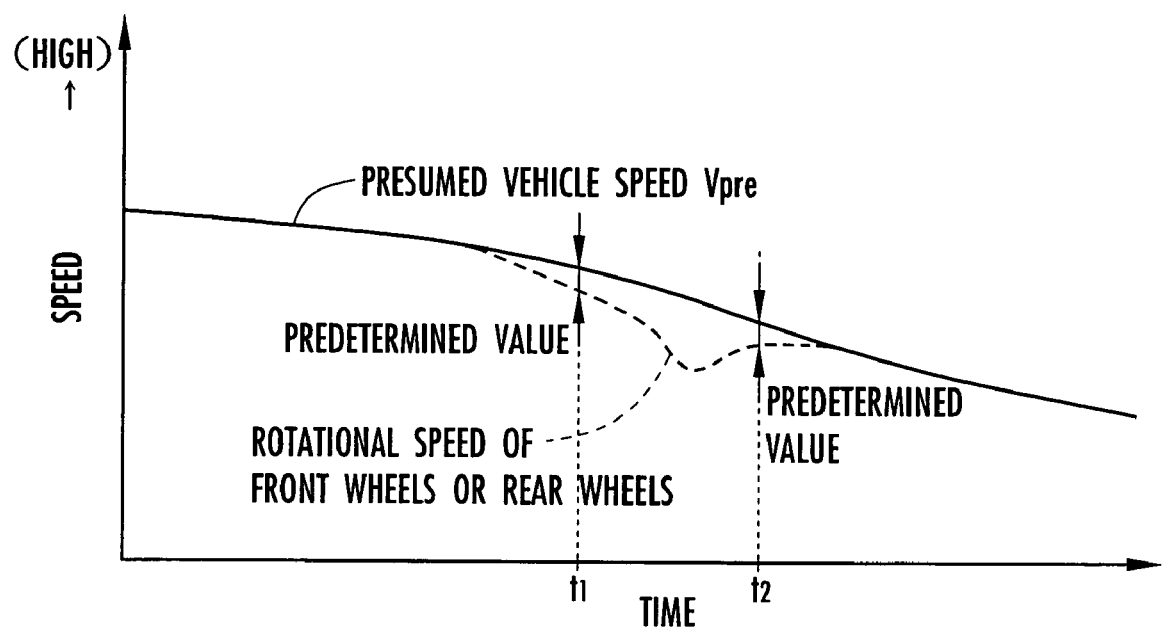
FIG. 13 is a flowchart showing essential processing of the flowchart of FIG. 12.

More specifically in the present embodiment, the control processing illustrated by the flowchart of FIG. 12 in place of the flowchart shown in FIG. 2 in the first embodiment is carried out by an ECU 15 at a predetermined control cycle. In the control processing, an aspect that is different from the first embodiment will be explained. In the present embodiment, it is determined in STEP4' whether front wheels 2, 2 or rear wheels 3, 3 of the vehicle 1 are slipping before it is determined in STEP 4 (after STEP3) whether the vehicle 1 is traveling straight. If the determination result is affirmative, then determination processing of STEP4 is implemented. If the determination result of STEP4' is negative, that is, if slippage of the front wheels 2 or 3 has been detected, then the ECU 15 proceeds to STEP6 wherein the control processing in the standard regenerative mode is carried out. The rest is the same as that in the first embodiment.

In this case, whether the wheels 2 or 3 are slipping is determined in STEP4' according to, for example, the following method. After the vehicle 1 starts slowing down (more specifically, after the control processing in the rear-based regenerative mode or the standard regenerative mode is started), a vehicle speed V is sequentially presumed on the basis of a vehicle target deceleration force Tar_G set in one of these regenerative modes. The presumed values will be hereinafter referred to as a presumed vehicle speed Vpre. FIG. 13 shows an example of the presumed vehicle speed Vpre that changes with time, the speed Vpre being indicated by a solid line.

The rotational speeds of the wheels 2 and 3 are sequentially detected using a sensor (not shown), and the vehicle speed V is sequentially presumed when it is assumed that the front wheels 2 and 2 are not slipping from a mean value of the detection values of the rotational speeds of the front wheels 2 and 2. At the same time, the vehicle speed V is sequentially presumed when it is assumed that the rear wheels 3 and 3 are not slipping from a mean value of the detection values of the rotational speeds of the rear wheels 3 and 3.

Hereinafter, presumed vehicle speeds based on the mean values of the rotational speeds of the front wheels 2 and 2 will be referred to as "the front wheel speeds" and presumed vehicle speeds based on the mean values of the rotational speeds of the rear wheels 3 and 3 will be referred to as "the rear wheel speeds." If the absolute value of the difference between the front wheel speed and the presumed vehicle speed Vpre reaches a predetermined value or more, then it is determined that the front wheels 2 and 2 have incurred slipping. Similarly, if the absolute value of the difference between the rear wheel speed and the presumed vehicle speed Vpre reaches a predetermined value or more, then it is determined that the rear wheels 3 and 3 have incurred slipping. For instance, when the front wheel speed or the rear wheel speed changes relative to the presumed vehicle speed Vpre as indicated by the dashed line in FIG. 13, it is detected that the front wheels 2, 2 or the rear wheels 3, 3 slip during the period from time t1 to time t2. The speed of the wheels that are not slipping will be substantially equal to the presumed vehicle speed Vpre.

According to the present embodiment, the control processing in the standard regenerative mode is carried out when slippage of the wheels 2 or 3 is detected, thus making it possible to secure the rolling friction of the wheels 2 and 3.

In the first and second embodiments explained above, the control processing of STEP21 in the standard regenerative mode (refer to FIG. 11) is identical to the control processing in the STEP21 in the rear-based regenerative mode (refer to FIG. 3). Alternatively, however, the following processing may be implemented in the standard regenerative mode. The front wheel target braking torque Obj_Trq_F by the regenerative operation of the first generator-motor 5 may be set to the front wheel ideal braking torque Ideal_Trq_F or the front wheel regenerative torque Pos_Trq_F_MOT, whichever is smaller. Similarly, the rear wheel target braking torque Obj_Trq_R by the regenerative operation of the second generator-motor 7 may be set to the rear wheel ideal braking torque Ideal_Trq_R or the rear wheel regenerative torque Pos_Trq_R_MOT, whichever is smaller. Then, the difference between the front wheel target braking torque Obj_Trq_F and the front wheel ideal braking torque Ideal_Trq_F (to be more specific, |Ideal_Trq_F−Obj_Trq_F|) may be set as the front wheel mechanical target braking torque Obj_Trq_Br_F, and the difference between the rear wheel target braking torque Obj_Trq_R and the rear wheel ideal braking torque Ideal_Trq_R (to be more specific, |Ideal_Trq_R−Obj_Trq_R|) may be set as the rear wheel mechanical target braking torque Obj_Trq_Br_R. With this arrangement, the total braking torque of the front wheels 2, 2 will always agree with Ideal_Trq_F, and the total braking torque of the rear wheels 3, 3 will always agree with Ideal_Trq_R in the standard regenerative mode.

Furthermore, in the first and second embodiments have presented the examples wherein the engine 4, the first generator-motor 5, and the transmission 6 are disposed adjacently to the front wheels 2 and 2, while the second generator-motor 7 is disposed adjacently to the rear wheels 3 and 3. Alternatively, however, the engine, the first generator-motor, and the transmission may be disposed adjacently to the rear wheels, and the torque generated in the engine and/or the first generator-motor may be imparted to the rear wheels through the intermediary of the transmission, while the second generator-motor may be disposed adjacently to the front wheels to impart the torque generated in the second generator-motor to the front wheels.

What is claimed is:

1. A hybrid vehicle comprising:
   a first generator-motor connected to an output shaft of an engine that generates a driving force of the vehicle and also connected to either one of a pair of front wheels and a pair of rear wheels of the vehicle through the intermediary of a transmission so as to be capable of imparting torque to one of the pairs of wheels through the intermediary of the transmission;
   a second generator-motor connected to the other pair of wheels of the vehicle through the intermediary of a rotation transmitting means that has a higher torque transmission efficiency than at least the transmission so as to be capable of imparting torque to the other pair of wheels through the intermediary of the rotation transmitting means;
   target deceleration force setting means for setting a target deceleration force of the vehicle when the vehicle decelerates;
   second permissible maximum braking torque setting means for setting a second permissible maximum braking torque as a permissible maximum value of braking torque to be applied to the other pair of wheels from the second generator-motor;
   a target braking torque determining means for determining a target decelerating torque of the vehicle, that corresponds to the target deceleration force or the second permissible maximum braking torque, whichever is smaller, as a target braking torque to be imparted to the other pair of wheels from the second generator-motor,
   and for determining the target braking torque by taking a remaining torque, which is obtained by subtracting a target braking torque related to the second generator-motor from the target deceleration torque, has an upper limit of a target braking torque to be imparted to the one pair of wheels from the first generator-motor, and
   control means for making the generator-motors perform regenerative operations such that the determined target braking torques are imparted to corresponding wheels from the respective generator-motors.

2. The hybrid vehicle according to claim 1, wherein the target deceleration force setting means sets the target deceleration force on the basis of the speed of the vehicle, a gear position of the transmission, and a brake operation amount of the vehicle.

3. The hybrid vehicle according to claim 1, wherein the second permissible maximum braking torque setting means sets the second permissible maximum braking torque according to at least a road surface condition, setting the permissible maximum value of the braking torque of the other pair of wheels whereby a predetermined frictional force can be secured between the other pair of wheels and the road surface as the second permissible maximum braking torque.

4. The hybrid vehicle according to claim 1, wherein the second permissible maximum braking torque setting means takes, as the second permissible maximum braking torque, a permissible maximum value of braking torque that can be imparted by the regenerative operation of the second generator-motor to the other pair of wheels, and sets the second permissible maximum braking torque according to at least a rated power generation output of the second generator-motor and the state of charge of a battery charged by the regenerative operation of the second generator-motor.

5. The hybrid vehicle according to claim 1, wherein
the second permissible maximum braking torque is composed of a mechanical permissible maximum value as the permissible maximum value of the braking torque of the other pair of wheels whereby a predetermined frictional force between the other pair of wheels and a road surface can be secured, and an electrical permissible maximum value as the permissible maximum value of the braking torque that can be imparted to the other pair of wheels by the regenerative operation of the second generator-motor,
the second permissible maximum braking torque setting means sets the mechanical permissible maximum value according to at least a road surface condition and sets the electrical permissible maximum value according to at least a rated power generation output of the second generator-motor and a state of charge of the battery charged by the regenerative operation of the second generator-motor,
and the target braking torque determining means determines the target deceleration torque, the mechanical permissible maximum value, or the electrical permissible maximum value, whichever the smallest, as the target braking torque to be imparted to the other pair of wheels from the second generator-motor.

6. The hybrid vehicle according to claim 1, comprising first permissible maximum braking torque setting means for setting a first permissible maximum braking torque as a permissible maximum value of the braking torque to be imparted to the one pair of wheels from the first generator-motor,
wherein the target braking torque determining means determines the remaining torque or the first permissible maximum braking torque, whichever is smaller, as a target braking torque to be imparted to the one pair of wheels from the first generator-motor, while, if a total sum of the target braking torque related to both generator-motors is below a target deceleration torque of the vehicle, then it determines the deficient torque as the target braking torque for friction type braking mechanisms provided for the one pair of wheels and the other pair of wheels, and
the control means further comprises means for controlling the friction type braking mechanisms so as to make the friction type braking mechanisms to produce the target braking torque.

7. The hybrid vehicle according to claim 6, wherein the first permissible maximum braking torque setting means takes, as the first permissible maximum braking torque, a permissible maximum value of the braking torque of the one pair of wheels that allows a predetermined frictional force between the one pair of wheels and a road surface to be secured, and sets the first permissible maximum braking torque according to at least a road surface condition.

8. The hybrid vehicle according to claim 6, wherein the first permissible maximum braking torque setting means takes, as the first permissible maximum braking torque, a permissible maximum value of braking torque that can be imparted by the regenerative operation of the first generator-motor to the one pair of wheels, and sets the first permissible maximum braking torque according to at least a rated power generation output of the first generator-motor and the state of charge of a battery charged by the regenerative operation of the first generator-motor.

9. The hybrid vehicle according to claim 6, wherein
the first permissible maximum braking torque is composed of a mechanical permissible maximum value as the permissible maximum value of the braking torque of the one pair of wheels whereby a predetermined frictional force between the one pair of wheels and a road surface can be secured, and an electrical permissible maximum value as the permissible maximum value of the braking torque that can be imparted to the one pair of wheels by the regenerative operation of the first generator-motor,
the first permissible maximum braking torque setting means sets the mechanical permissible maximum value for the one pair of wheels according to at least a road surface condition and sets the electrical permissible maximum value for the first generator-motor according to at least a rated power generation output of the first generator-motor and a state of charge of the battery charged by the regenerative operation of the first generator-motor, and
the target braking torque determining means determines the remaining torque, the mechanical permissible maximum value for the one pair of wheels, or the electrical permissible maximum value for the first generator-motor, whichever the smallest, as the target braking torque to be imparted to the one pair of wheels from the first generator-motor.

10. The hybrid vehicle according to claim 6, wherein, if a total sum of the target braking torques related to the two generator-motors is below a target deceleration torque, then the target braking torque setting means determines the target braking torque of the friction type braking mechanism of the one pair of wheels and the target braking torque of the friction type braking mechanism of the other pair of wheels such that the ratio of the total sum of a target braking torque for the first generator-motor and a target braking torque of the friction type braking mechanism of the one pair of wheels to the target deceleration torque and the ratio of the total sum of a target braking torque for the second generator-motor and a target braking torque of the friction type braking mechanism of the other pair of wheels to the target deceleration torque approximate a predetermined ratio established on the basis of a longitudinal weight distribution of the vehicle and the target deceleration torque.

11. The hybrid vehicle according to claim 1, comprising a means for determining whether the vehicle is traveling straight, wherein
the control means comprises a means for controlling the generator-motors and the friction type braking mechanisms so that the ratio of the total sum of a braking torque imparted to the one pair of wheels from the first generator-motor and a braking torque of the friction type braking mechanism of the one pair of wheels to the target deceleration torque and the ratio of the total sum of a braking torque imparted to the other pair of wheels from the second generator-motor and a braking torque of the friction type braking mechanism of the other pair of wheels to the target deceleration torque approximate a predetermined ratio established on the basis of a longitudinal weight distribution of the vehicle and the target deceleration torque, if it is determined that the vehicle is not traveling straight.

12. The hybrid vehicle according to claim 1, comprising a means for determining whether any one of the wheels of the vehicle is slipping, wherein the control means comprises a means for controlling the generator-motors and the friction type braking mechanisms so that the ratio of the total sum of a braking torque imparted to the one pair of wheels from the first generator-motor and a braking torque of the friction type braking mechanism of the one pair of wheels to the target deceleration torque and the ratio of the total sum of a braking torque imparted to the other pair of wheels from the second generator-motor and a braking torque of the friction type braking mechanism of the other pair of wheels to the target deceleration torque approximate a predetermined ratio established on the basis of a longitudinal weight distribution of the vehicle and the target deceleration torque, if it is determined that a wheel is slipping.

13. A hybrid vehicle comprising:

a first generator-motor connected to an output shaft of an engine that generates a driving force of the vehicle and also connected to either one of a pair of front wheels and a pair of rear wheels of the vehicle through the intermediary of a transmission so as to be capable of imparting torque to one of the pairs of wheels through the intermediary of the transmission;

a second generator-motor connected to the other pair of wheels of the vehicle through the intermediary of a rotation transmitting means that has a higher torque transmission efficiency than at least the transmission so as to be capable of imparting torque to the other pair of wheels through the intermediary of the rotation transmitting means;

target deceleration force setting means for setting a target deceleration force of the vehicle when the vehicle decelerates;

second permissible maximum braking torque setting means for setting a second permissible maximum braking torque as a permissible maximum value of braking torque to be applied to the other pair of wheels from the second generator-motor;

a target braking torque determining means for determining a target decelerating torque of the vehicle that corresponds to the target deceleration force as a target braking torque to be wholly imparted to the other pair of wheels from the second generator-motor, when the target deceleration force is smaller than the second permissible maximum braking torque, and for determining the target decelerating torque of the vehicle that corresponds to the second permissible maximum braking torque as the target braking torque to be imparted to the other pair of wheels from the second generator-motor, and determining the target braking torque by taking a remaining torque, which is obtained by subtracting a target braking torque related to the second generator-motor from the target deceleration torque, as an upper limit of a target braking torque to be imparted to the one pair of wheels from the first generator-motor; and control means for making the generator-motors perform regenerative operations such that the determined target braking torques are imparted to corresponding wheels from the respective generator-motors.

14. A hybrid vehicle comprising:

a first generator-motor connected to an output shaft of an engine that generates a driving force of the vehicle and also connected to either one of a pair of front wheels and a pair of rear wheels of the vehicle through the intermediary of a transmission so as to be capable of imparting torque to one of the pairs of wheels through the intermediary of the transmission;

a second generator-motor connected to the other pair of wheels of the vehicle through the intermediary of a rotation transmitting means that has a higher torque transmission efficiency than at least the transmission so as to be capable of imparting torque to the other pair of wheels through the intermediary of the rotation transmitting means;

target deceleration force setting means for setting a target deceleration force of the vehicle when the vehicle decelerates;

second permissible maximum braking torque setting means for setting a second permissible maximum braking torque, wherein the second permissible maximum braking torque corresponds to a permissible maximum value of braking torque to be applied from the second generator motor to the other pair of wheels;

a target braking torque determining means for determining a target decelerating torque of the vehicle, wherein the target decelerating torque corresponds to the smaller of the target deceleration force and the second permissible maximum braking torque, and further wherein the target decelerating torque is utilized as an upper limit of a target braking torque to be imparted to the other pair of wheels from the second generator-motor, and for determining the target braking torque to one of the pair of wheels by utilizing a remaining torque, wherein the remaining torque has an upper limit of the target braking torque to be imparted to the one pair of wheels from the first generator-motor, and wherein the remaining torque is obtained by subtracting the target braking torque from the second generator-motor to be imparted to the other pair of wheels from the target deceleration torque, and if the target braking torque from the second generator motor to be imparted to the other pair of wheels is set to be the same value as that of the target deceleration torque, then the remaining torque will be zero, and the target braking torque to be imparted to the one pair of wheels from the first generator-motor will also be zero; and control means for making the generator-motors perform regenerative operations such that the determined target braking torques are imparted to corresponding wheels from the respective generator-motors.

* * * * *